(12) United States Patent
Yoon et al.

(10) Patent No.: US 12,064,080 B2
(45) Date of Patent: Aug. 20, 2024

(54) CLEANING ROBOT AND CONTROL METHOD THEREOF

(71) Applicant: Samsung Electronics Co., Ltd., Suwon-si (KR)

(72) Inventors: Heesuk Yoon, Suwon-si (KR); Injoo Kim, Suwon-si (KR); Kyongsu Kim, Suwon-si (KR); Sanghyuk Park, Suwon-si (KR); Sukhoon Song, Suwon-si (KR); Dongmin Shin, Suwon-si (KR); Kiyong Lee, Suwon-si (KR); Yeonkyu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 17/483,081

(22) Filed: Sep. 23, 2021

(65) Prior Publication Data

US 2022/0061616 A1   Mar. 3, 2022

Related U.S. Application Data

(63) Continuation of application No. PCT/KR2021/011472, filed on Aug. 26, 2021.

(30) Foreign Application Priority Data

Aug. 28, 2020 (KR) ........................ 10-2020-0109305

(51) Int. Cl.
*A47L 9/28* (2006.01)
*A47L 9/00* (2006.01)
(Continued)

(52) U.S. Cl.
CPC ............. *A47L 9/2805* (2013.01); *A47L 9/009* (2013.01); *A47L 9/2852* (2013.01);
(Continued)

(58) Field of Classification Search
CPC ...... G01S 7/4811; G01S 7/497; A47L 9/2805; A47L 9/04; A47L 9/28
See application file for complete search history.

(56) References Cited

U.S. PATENT DOCUMENTS

| 10,962,647 B2 | 3/2021 | Shin et al. |
| 2016/0058261 A1 | 3/2016 | Dyson et al. |
| (Continued) | | |

FOREIGN PATENT DOCUMENTS

| JP | 4181477 B2 | 11/2008 |
| KR | 1992-0007557 Y1 | 10/1992 |
| (Continued) | | |

OTHER PUBLICATIONS

International Search Report dated Nov. 25, 2021, issued in International Application No. PCT/KR2021/011472.

*Primary Examiner* — Michael D Jennings
(74) *Attorney, Agent, or Firm* — Jefferson IP Law, LLP

(57) ABSTRACT

A cleaning robot capable of entering a region under an obstacle and cleaning by reducing a height of a LiDAR sensor, and a control method thereof are provided. The cleaning robot includes a main body, a driving device, a cleaning device, a LiDAR sensor and configured to be raisable and lowerable between a first position and a second position having different heights, a bumper sensor configured to detect a collision between the LiDAR sensor and an obstacle, an obstacle sensor configured to obtain information on an obstacle, and a processor configured to generate a cleaning map based on an output of the LiDAR sensor and an output of the obstacle sensor, and control the sensor driver to adjust a height of the LiDAR sensor based on at least one of the cleaning map, an output of the bumper sensor, or the output of the obstacle sensor.

18 Claims, 22 Drawing Sheets

(51) Int. Cl.
 *G01S 7/481* (2006.01)
 *G01S 7/497* (2006.01)
 *G01S 17/89* (2020.01)
 *G01S 17/931* (2020.01)

(52) U.S. Cl.
 CPC ............ *G01S 7/4811* (2013.01); *G01S 7/497* (2013.01); *G01S 17/89* (2013.01); *G01S 17/931* (2020.01); *A47L 2201/04* (2013.01); *A47L 2201/06* (2013.01)

(56) References Cited

U.S. PATENT DOCUMENTS

| | | |
|---|---|---|
| 2018/0292837 A1 | 10/2018 | Chen et al. |
| 2019/0038105 A1* | 2/2019 | Park .......................... A47L 9/28 |
| 2019/0090711 A1* | 3/2019 | Lee ....................... A47L 9/2857 |
| 2020/0235697 A1 | 7/2020 | Zhu et al. |
| 2021/0121035 A1* | 4/2021 | Kim ....................... A47L 9/2857 |
| 2021/0302569 A1 | 9/2021 | Lincoln et al. |
| 2021/0393101 A1* | 12/2021 | Zhou ................... A47L 11/4069 |
| 2022/0257074 A1 | 8/2022 | Shim et al. |
| 2023/0061444 A1* | 3/2023 | Hong ................... G05D 1/0274 |

FOREIGN PATENT DOCUMENTS

| | | |
|---|---|---|
| KR | 10-0911472 B1 | 8/2009 |
| KR | 10-1395888 B1 | 5/2014 |
| KR | 10-2014-0109175 A | 9/2014 |
| KR | 10-2015-0127937 A | 11/2015 |
| KR | 10-2019-0119232 A | 10/2019 |
| KR | 10-2035018 B1 | 10/2019 |
| KR | 10-2103291 B1 | 5/2020 |
| KR | 10-2117868 B1 | 6/2020 |
| KR | 10-2306434 B1 | 9/2021 |
| WO | 2021/196467 A1 | 10/2021 |

* cited by examiner

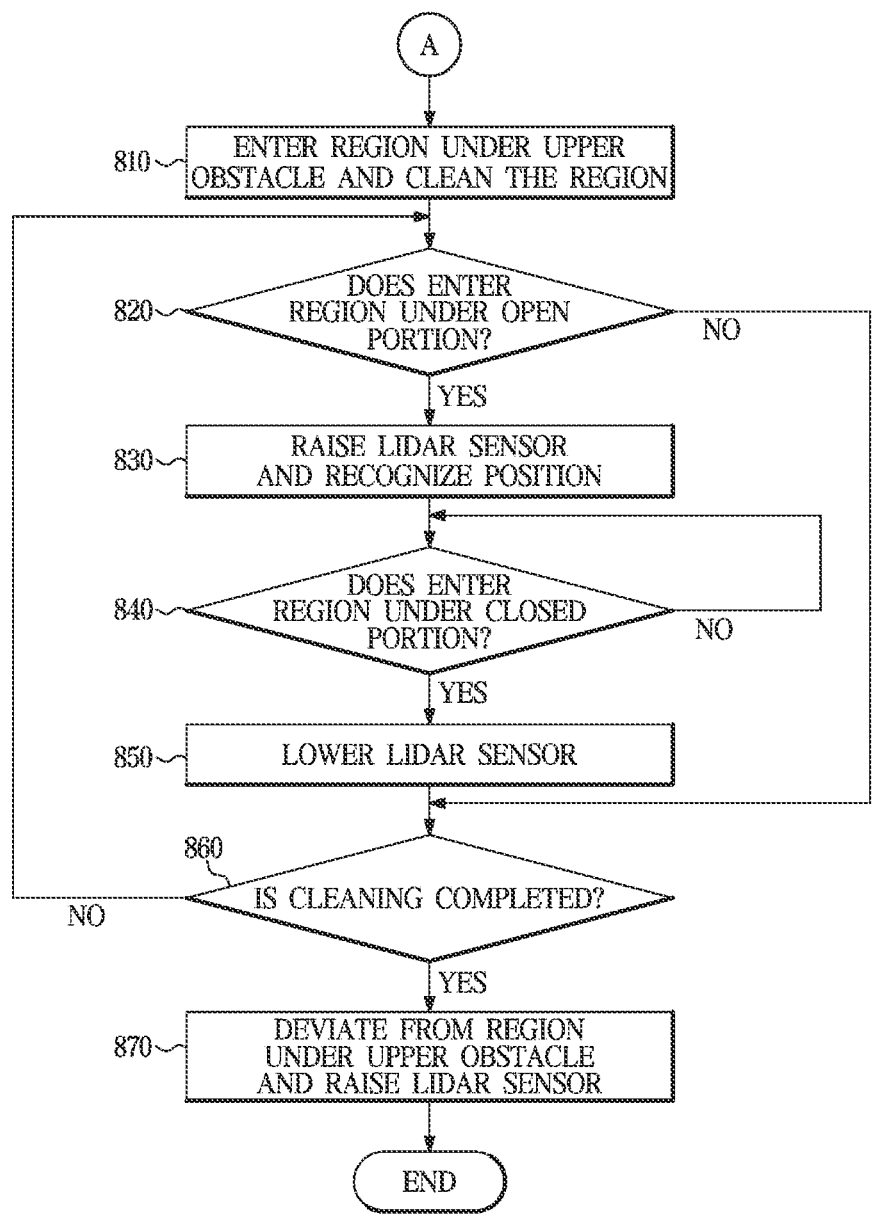

CLEANING ROBOT AND CONTROL METHOD THEREOF

CROSS-REFERENCE TO RELATED APPLICATION(S)

This application is a continuation application, claiming priority under § 365(c), of an International application No. PCT/KR2021/011472, filed on Aug. 26, 2021, which is based on and claims the benefit of a Korean patent application number 10-2020-0109305, filed on Aug. 28, 2020, in the Korean Intellectual Property, the disclosure of which is incorporated by reference herein in its entirety.

TECHNICAL FIELD

The disclosure relates to a cleaning robot capable of recognizing a position and detecting an obstacle, and a control method thereof.

BACKGROUND ART

A cleaning robot is a device that performs cleaning by moving in a certain region on its own without a user's separate manipulation. The cleaning robot may autonomously recognize a position thereof by sensors and move and avoid obstacles in a path of the cleaning robot.

By using a Light Detection And Ranging (LiDAR) sensor configured to calculate a distance to an obstacle through Time of Flight (TOF) method, the cleaning robot may detect surrounding obstacles or recognize a position of the cleaning robot based on the detection of the obstacle, and generate a map of the surrounding environment by using Simultaneous Localization And Mapping (SLAM) technology, thereby performing autonomous driving.

The above information is presented as background information only to assist with an understanding of the disclosure. No determination has been made, and no assertion is made, as to whether any of the above might be applicable as prior art with regard to the disclosure.

DISCLOSURE

Technical Problem

The disclosure is directed to providing a cleaning robot, when an upper obstacle spaced from a floor is located on a driving path, capable of entering a region under the upper obstacle and performing cleaning by reducing a height of a Light Detection And Ranging (LiDAR) sensor, and a control method thereof.

Technical Solution

According to an aspect of the present disclosure, a cleaning robot is provided. The cleaning robot includes a main body, a driving device configured to move the main body, a cleaning device configured to perform cleaning by vacuuming foreign substances on a floor, a Light Detection And Ranging (LiDAR) sensor disposed on an upper portion of the main body and configured to be raisable and lowerable between a first position and a second position, the first position and the second position having different heights, a bumper sensor configured to detect a collision between the LiDAR sensor and an obstacle, a sensor driver configured to generate power for raising and lowering the LiDAR sensor, an obstacle sensor configured to obtain information on an obstacle, and a processor configured to generate a cleaning map about a surrounding environment of the main body based on an output of the LiDAR sensor and an output of the obstacle sensor, and control the sensor driver to adjust a height of the LiDAR sensor based on at least one of the cleaning map, an output of the bumper sensor or the output of the obstacle sensor.

The processor may control the sensor driver to reduce the height of the LiDAR sensor in response to a collision between the LiDAR sensor and the obstacle detected by the bumper sensor.

In response to an upper obstacle spaced from the floor being placed in front of the main body, and a height of the upper obstacle exceeding a height of the main body or a height of the LiDAR sensor at the first position and being less than or equal to a height of the LiDAR sensor at the second position, the processor may control the sensor driver to reduce the height of the LiDAR sensor.

The LiDAR sensor may be inserted into an inside of the main body at the first position, and the LiDAR sensor may protrude to an outside of the main body at the second position.

The processor may turn off the power of the LiDAR sensor in response to the LiDAR sensor being lowered from the second position to the first position, and the processor may turn on the power of the LiDAR sensor in response to the LiDAR sensor being raised from the first position to the second position.

After lowering the LiDAR sensor to the first position, the processor may control the driving device and the cleaning device to allow the main body to drive in a region under the upper obstacle so as to perform cleaning of the region under the upper obstacle.

In response to the cleaning of the region under the upper obstacle being completed, the processor may control the sensor driver to raise the LiDAR sensor to the second position.

In response to the LiDAR sensor not reaching the second position even when the processor controls the sensor driver to raise the LiDAR sensor to the second position, the processor may control the sensor driver to lower the LiDAR sensor to the first position.

In response to the cleaning robot being in an error state, a standby state, or a charging state, the processor may control the sensor driver to lower the LiDAR sensor to the first position and turn off the power of the LiDAR sensor.

In response to a situation, in which the LiDAR sensor does not reach the second position after the processor controls the sensor driver to raise the LiDAR sensor from the first position to the second position, or the LiDAR sensor does not reach the first position after the processor controls the sensor driver to lower the LiDAR sensor from the second position to the first position, occurring more than a predetermined number of times, the processor may determine that the cleaning robot is in the error state.

The cleaning map may include a reference map and a real-time map, and when the reference map about the surrounding environment of the cleaning robot is not present, the processor may generate the reference map based on the output of the LiDAR sensor and the output of the obstacle sensor and store the generated reference map in a memory, and the processor may control the driving device to drive based on the reference map.

The processor may generate the real-time map based on the output of the LiDAR sensor, and the processor may recognize a position of the cleaning robot by comparing the reference map with the real-time map.

The processor may modify the reference map stored in the memory based on the real-time map.

The processor may divide the region under the upper obstacle into a plurality of sub-regions, and in response to cleaning of a first sub-region among the plurality of sub-regions being completed, the processor may control the driving device and the sensor driver to deviate from the first sub-region in which the cleaning is competed, and to raise the LiDAR sensor from the first position to the second position.

The processor may re-recognize a position of the cleaning robot based on the output of the LiDAR sensor, and in response to the re-recognition of the position being completed, the processor may control the sensor driver to lower the LiDAR sensor to the first position, and the processor may control the driving device and the cleaning device to enter a second sub-region among the plurality of sub-regions and to perform cleaning of the second sub-region.

The processor may determine the number of the plurality of sub-regions based on a driving environment of the region under the upper obstacle.

The obstacle sensor may include a 3D sensor, and the processor may be configured to determine information on an inner portion of the upper obstacle based on an output of the 3D sensor.

When a partial portion of the upper obstacle is open and the main body enters a region under the open portion, the processor may control the sensor driver to raise the LiDAR sensor from the first position to the second position and the processor may perform position recognition based on an output of the LiDAR sensor at the second position.

Additional aspects will be set forth in part in the description which follows and, in part, will be apparent from the description, or may be learned by practice of the presented embodiments.

In accordance with an aspect of the disclosure, a control method of a cleaning robot including a main body, a driving portion configured to move the main body, and a cleaning portion configured to perform cleaning by sucking foreign substances on a floor, is provided. The control method includes generating a cleaning map about a surrounding environment of the main body based on an output of a Light Detection And Ranging (LiDAR) sensor disposed on an upper portion of the main body and configured to be raisable and lowerable between a first position and a second position of different heights and an output of an obstacle sensor configured to obtain information on an obstacle, and adjusting a height of the LiDAR sensor based on at least one of an output of a bumper sensor configured to detect a collision between the LiDAR sensor and an obstacle, the output of the obstacle sensor, or the cleaning map.

The adjustment of the height of the LiDAR sensor may include controlling a sensor driver of the cleaning robot to reduce the height of the LiDAR sensor in response to a collision between the LiDAR sensor and the obstacle detected by the bumper sensor.

The adjustment of the height of the LiDAR sensor may include, in response to an upper obstacle spaced from the floor being placed in front of the main body, and a height of the upper obstacle exceeding a height of the main body or a height of the LiDAR sensor at the first position and being less than or equal to a height of the LiDAR sensor at the second position, controlling the sensor driver to reduce the height of the LiDAR sensor.

The control method may further include turning off the power of the LiDAR sensor in response to the LiDAR sensor being lowered from the second position to the first position, and turning on the power of the LiDAR sensor in response to the LiDAR sensor being raised from the first position to the second position.

The control method may further include, after lowering the LiDAR sensor to the first position, controlling the driving device and the cleaning device to allow the main body to drive in a region under the upper obstacle so as to perform cleaning of the region under the upper obstacle.

The control method may further include controlling the sensor driver to raise the LiDAR sensor to the second position in response to the cleaning of the region under the upper obstacle being completed.

The control method may further include, in response to the LiDAR sensor not reaching the second position even when controlling the sensor driver to raise the LiDAR sensor to the second position, controlling the sensor driver to lower the LiDAR sensor to the first position.

The control method may further include, in response to the cleaning robot being in an error state, a standby state, or a charging state, controlling the sensor driver to lower the LiDAR sensor to the first position and turning off the power of the LiDAR sensor.

The control method may further include, in response to a situation, in which the LiDAR sensor does not reach the second position after controlling the sensor driver to raise the LiDAR sensor from the first position to the second position, or a situation, in which the LiDAR sensor does not reach the first position after controlling the sensor driver to lower the LiDAR sensor from the second position to the first position, occurring more than a predetermined number of times, determining that the cleaning robot is in the error state.

The control method may further include dividing the region under the upper obstacle into a plurality of sub-regions, and the adjustment of the height of the LiDAR sensor may include, in response to cleaning of a first sub-region among the plurality of sub-regions being completed, controlling the sensor driver to raise the LiDAR sensor from the first position to the second position in a region out of the first sub-region in which the cleaning is competed.

The control method may further include re-recognizing a position of the cleaning robot based on the output of the LiDAR sensor, and in response to the re-recognition of the position being completed, controlling the sensor driver to lower the LiDAR sensor to the first position, and controlling the driving device and the cleaning device to enter a second sub-region among the plurality of sub-regions and to perform cleaning of the second sub-region.

The division of the region under the upper obstacle into a plurality of sub-regions may include determining the number of the plurality of sub-regions based on a driving environment of the region under the upper obstacle.

The obstacle sensor may include a 3D sensor, and the generation of the cleaning map may include determining information on an inner portion of the upper obstacle based on an output of the 3D sensor.

The adjustment of the height of the LiDAR sensor may include, when a partial portion of the upper obstacle is open, and the main body enters a region under the open portion, controlling the sensor driver to raise the LiDAR sensor from the first position to the second position.

Advantageous Effects

By a cleaning robot and a control method thereof, even when an upper obstacle spaced from a floor is placed on a driving path, it is possible to enter a region under the upper obstacle by reducing a height of a Light Detection And Ranging (LiDAR) sensor and to perform cleaning thereof.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 22 is a flowchart illustrating an embodiment of raising the LiDAR sensor again while driving the region under the upper obstacle in the control method of the cleaning robot according to an embodiment of the disclosure.

Throughout the drawings, like reference numerals will be understood to refer to like parts, components, and structures.

MODES OF THE INVENTION

Figure 1:
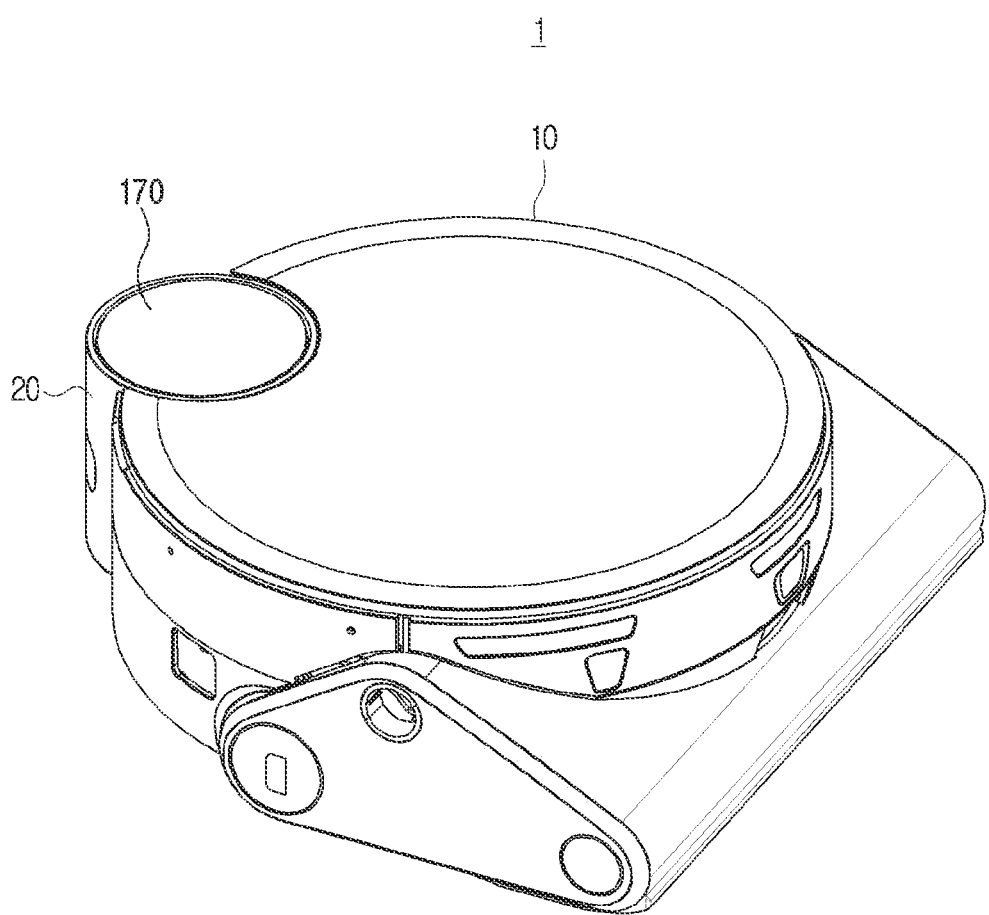
FIG. 1 is a perspective view illustrating a state in which a Light Detection And Ranging (LiDAR) sensor of a cleaning robot is inserted into a main body according to an embodiment of the disclosure.

The following description with reference to the accompanying drawings is provided to assist in a comprehensive understanding of various embodiments of the disclosure as defined by the claims and their equivalents. It includes various specific details to assist in that understanding but, these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Throughout the description, when an element transmits or transfers a signal or data to another element, it does not preclude that another element exists between the element and the other element and thus the transmission and transfer is performed through another element unless otherwise stated.

The terms first, second, third, etc., may be used herein to distinguish a plurality of elements or a plurality of pieces of data, but the position, the priority, the processing order of the data or the size of the data value, etc., of the plurality of elements or the plurality of pieces of data may be not limited by these terms.

As used herein, expressions such as "at least one of," when preceding a list of elements, modify the entire list of elements and do not modify the individual elements of the list. For example, the expression, "at least one of a, b, or c," should be understood as including only a, only b, only c, both a and b, both a and c, both b and c, or all of a, b, and c.

An identification code is used for the convenience of the description but is not intended to illustrate the order of each step. The each step may be implemented in the order different from the illustrated order unless the context clearly indicates otherwise.

Hereinafter, various embodiments of a cleaning robot and a control method thereof according to the disclosure will be described in detail with reference to the accompanying drawings.

FIG. 1 is a perspective view illustrating a state in which a Light Detection And Ranging (LiDAR) sensor of a cleaning robot is inserted into a main body according to an embodiment of the disclosure.

Figure 2:
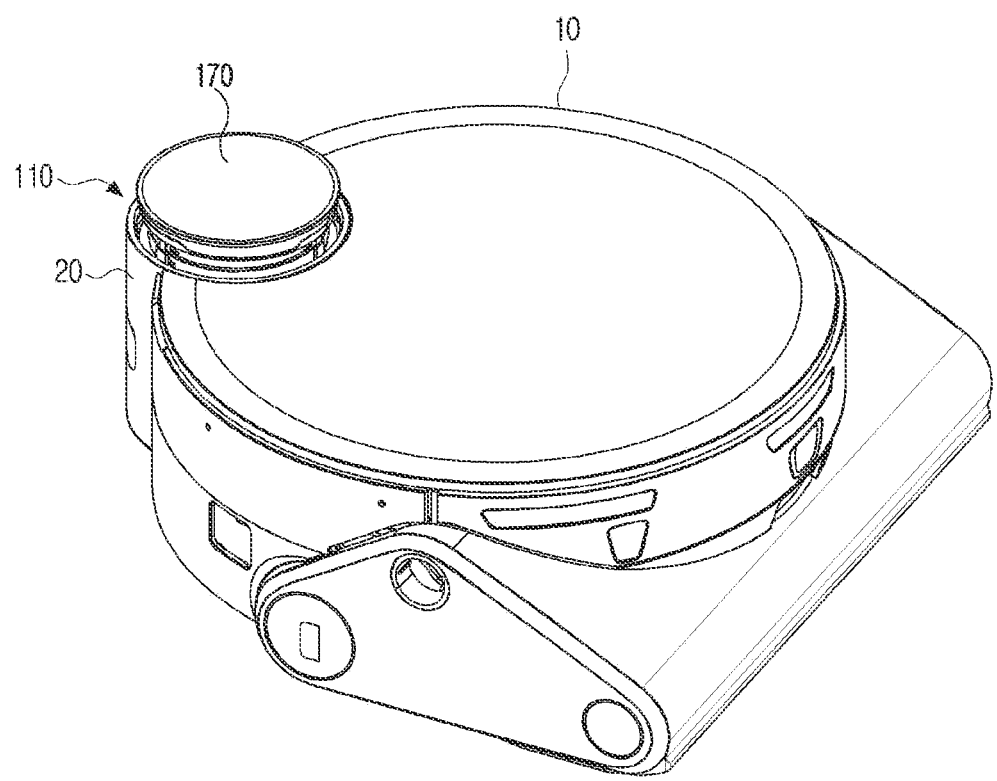
FIG. 2 is a perspective view illustrating a state in which the LiDAR sensor of the cleaning robot protrudes from the main body according to an embodiment of the disclosure.

FIG. 2 is a perspective view illustrating a state in which the LiDAR sensor of the cleaning robot protrudes from the main body according to an embodiment of the disclosure.

Figure 3:
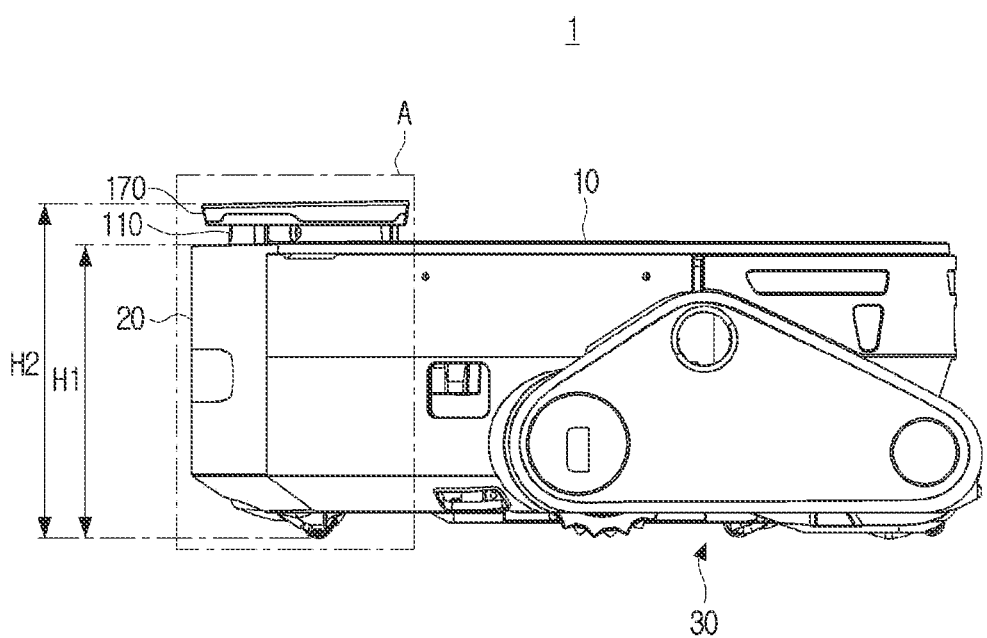
FIG. 3 is a side view of FIG. 2 according to an embodiment of the disclosure.

FIG. 3 is a side view of FIG. 2 according to an embodiment of the disclosure.

Referring to FIGS. 1 to 3, a cleaning robot 1 according to an embodiment of the disclosure include a main body 10 forming an exterior of the cleaning robot 1, a rear cover 20 and a driving device 30 for driving of the cleaning robot 1, and further include a LiDAR sensor 110 and a top cover 170 provided to cover an upper end of the LiDAR sensor 110.

The LiDAR sensor 110 may be disposed on an upper portion of the main body 10, and may be configured to be raisable and lowerable between a first position (refer to FIG. 1) and a second position (refer to FIG. 2) and the first position and the second position have a different height.

Referring to FIG. 3, a height H2 of the LiDAR sensor 110 at the second position is greater than a height H1 of the LiDAR sensor 110 at the first position with respect to the ground where the cleaning robot 1 is located.

For example, the LiDAR sensor 110 may be configured to be inserted into an inside of the main body 10 (refer to FIG. 1) and configured to protrude to an outside of the main body 10 (refer to FIG. 2). In response to the LiDAR sensor 110 being inserted into the inside of the main body 10, the LiDAR sensor 110 may be located at the first position, and in response to the LiDAR sensor 110 protruding to the outside of the main body 10, the LiDAR sensor 110 may be located at the second position.

In response to the LiDAR sensor 110 being inserted into the inside of the main body 10, the LiDAR sensor 110 may not operate. However, in a state in which the rear cover 20 is formed with a transparent material, the LiDAR sensor 110 may operate even when the LiDAR sensor 110 is inserted into the main body 10, so as to perform sensing of a rear region of the cleaning robot 1.

The height of the LiDAR sensor 110 may be controlled in accordance with the state of the cleaning robot 1. A detailed description of the height control of the LiDAR sensor 110 will be described later.

Figure 4:
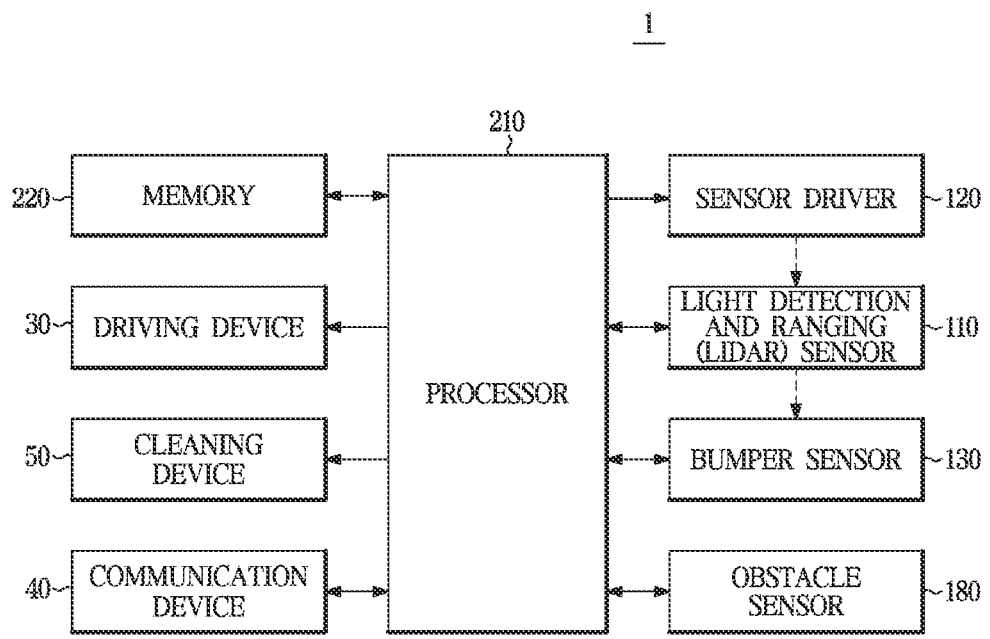
FIG. 4 is a control block diagram illustrating a configuration of the cleaning robot according to an embodiment of the disclosure.

FIG. 4 is a control block diagram illustrating a configuration of the cleaning robot according to an embodiment of the disclosure.

Figure 5:
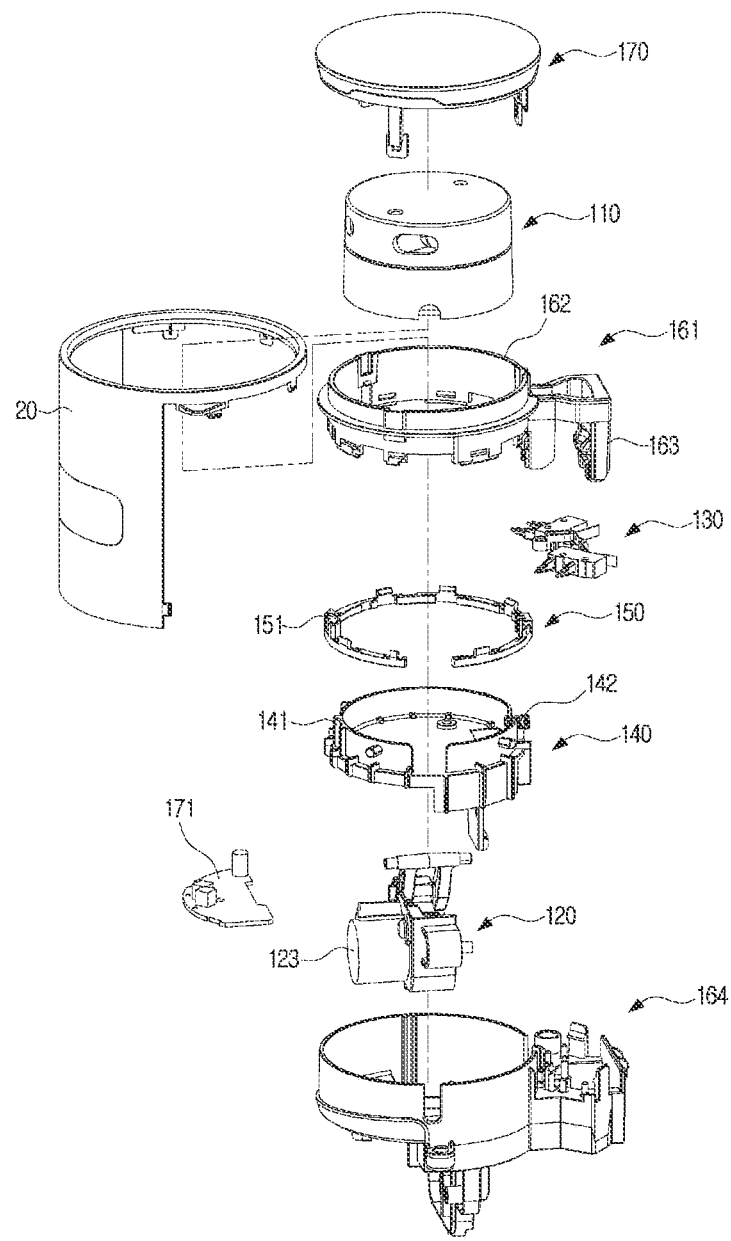
FIG. 5 is an exploded perspective view illustrating the LiDAR sensor and a configuration related to the LiDAR sensor provided in the cleaning robot according to an embodiment of the disclosure.

FIG. 5 is an exploded perspective view illustrating the LiDAR sensor and a configuration related to the LiDAR sensor provided in the cleaning robot according to an embodiment of the disclosure. A configuration illustrated in FIG. 5 is an internal configuration of a portion A of FIG. 3.

Referring to FIG. 4, the cleaning robot 1 includes the driving device 30 configured to move the main body 10, a cleaning device 50 configured to perform cleaning by vacuuming foreign substances on the floor, the LiDAR sensor 110 arranged on the upper portion of the main body 10 and configured to be raisable and lowerable between the first position and the second position, a sensor driver 120 configured to generate power for the raising and lowering of the LiDAR sensor 110, a bumper sensor 130 configured to detect a collision between an obstacle and the LiDAR sensor 110, an obstacle sensor 180 configured to obtain information on an obstacle, and a processor 210 configured to generate a cleaning map about a surrounding environment of the cleaning robot 1 based on an output of the LiDAR sensor 110 and the obstacle sensor 180, and configured to control the sensor driver 120 to adjust a height of the LiDAR sensor 110 based on at least one of the generated cleaning map, an output of the bumper sensor 130 or the output of the obstacle sensor 180.

The LiDAR sensor 110 is a sensor system that irradiates a high-power pulse laser having a specific frequency to an object and measures a time that a reflected wave is received from the object, so as to obtain information about a distance to the object.

Although there are various such LiDAR technologies, the LiDAR sensor 110 according to an embodiment of the disclosure is a type of LiDAR sensor 110 configured to perform image modeling for space as well as configured to obtain distance information about a driving direction of a laser beam. The LiDAR sensor 110 may collect point cloud information on the ground through point-scanning.

For example, the LiDAR sensor 110 may collect point cloud information while rotating 360 degrees at the second position protruding from the upper portion of the main body 10. However, the cleaning robot 1 is not limited thereto, and a rotation angle of the LiDAR sensor 110 may vary.

Referring to FIG. 5, the LiDAR sensor 110, a LiDAR sensor housing 140 provided to accommodate the LiDAR sensor 110, a bumper member 150 disposed around the LiDAR sensor housing 140, the bumper sensor 130, a bumper housing 161, the sensor driver 120, a lower housing 164, the top cover 170, and a circuit board 171 configured to control the sensor driver 120 may be arranged in a rear portion of the inside of the main body 10 of the cleaning robot 1.

The LiDAR sensor 110 may be disposed and fixed on the LiDAR sensor housing 140, and the LiDAR sensor housing 140 may be accommodated and fixed in an accommodating portion 162 of the bumper housing 161.

As the top cover 170 is disposed above the LiDAR sensor 110, the top cover 170 may protrude to the outside of the main body 10 when the LiDAR sensor 110 is located at the second position, and the top cover 170 may be located at the same height of an upper surface of the main body 10 when the LiDAR sensor 110 is located at the first position.

The top cover 170 may cover the LiDAR sensor 110 in a form of more protruding laterally than the LiDAR sensor 110. Accordingly, when the LiDAR sensor 110 collides with an external obstacle while being disposed at the second position protruding from the main body 10, the top cover 170 may come into primary contact with the obstacle so as to prevent the LiDAR sensor 110 from directly colliding with the obstacle.

The top cover 170 may be fixed to the bumper housing 161. In this case, when the top cover 170 collides with an external obstacle, an impact due to the collision may be transmitted to the bumper housing 161, and the impact may be transmitted to the bumper sensor 130 through a contact portion 163 of the bumper housing 161. Accordingly, the bumper sensor 130 may detect whether the LiDAR sensor 110 collides with the obstacle and may obtain information on a position of the obstacle by additionally detecting a contact direction.

Further, the LiDAR sensor housing 140 may include a guide groove 141 and a damping member 142 provided to mitigate an impact applied to the LiDAR sensor 110.

The bumper member 150 may be disposed along a periphery of the LiDAR sensor housing 140, and may include a guide member 151 provided at a position corresponding to a position of the guide groove 141, and formed to have a shape provided to be engaged with the shape of the guide groove 141.

When the position of the LiDAR sensor housing 140 changes due to an external impact, the LiDAR sensor housing 140 may be moved to an original position thereof due to a restoring force of the damping member 142. In this case, the bumper member 150 may guide the LiDAR sensor housing 140 to be moved to the original position of the LiDAR sensor housing 140 as the bumper member 150 has a fixed position inside the main body 10 and the guide groove 141 of the LiDAR sensor housing 140 is coupled to the guide member 151 of the bumper member 150.

The sensor driver 120 may include a driving motor 123 configured to supply a driving force. An upper end of the sensor driver 120 is coupled to the LiDAR sensor housing 140 to raise or lower the LiDAR sensor 110 so as to adjust the height of the LiDAR sensor 110. A detailed operation of the sensor driver 120 for adjusting the height of the LiDAR sensor 110 will be described later.

Referring to FIG. 3 again, the cleaning robot 1 may collect information for generating a cleaning map while driving in a cleaning region. For example, the cleaning robot 1 may collect point cloud information on the ground obtained by the LiDAR sensor 110 while driving in the cleaning region. In order to store the collected point cloud information, the cleaning robot 1 may further include a memory 220.

In addition, the cleaning robot 1 may obtain information on at least one obstacle located in the cleaning region using the obstacle sensor 180. For example, the obstacle sensor 180 may include at least one of various sensors such as an infrared sensor, an ultrasonic sensor, a visible light sensor, a laser sensor, an image sensor, an optical pattern sensor, or a 3D sensor.

The processor 210 may generate a cleaning map based on the point cloud information obtained by the LiDAR sensor 110 and the information on the obstacle obtained by the obstacle sensor 180. In one embodiment to be described later, the cleaning map may include a reference map and a real-time map.

First, the processor 210 may generate the reference map for the surrounding environment through Simultaneous Localization And Mapping (SLAM) technology configured to perform simultaneous location estimation and mapping, and may store the reference map in the memory 220. The reference map may be a map initially generated for the surrounding environment when there is no map generated by the cleaning robot 1 for the surrounding environment. When the reference map is generated, the processor 210 may control the driving device 30 to drive based on the reference map.

Further, the processor 210 may identify a current position based on the reference map. For example, the processor 210 may generate the real-time map of the surrounding environment of the cleaning robot 1 based on information received from the LiDAR sensor 110, and identify the current position of the cleaning robot 1 by comparing the real-time map with the reference map stored in the memory 220. This process is also called re-localization.

The real-time map may be generated based on the point cloud information obtained by the cleaning robot 1 about the surrounding environment of the current location by using the LiDAR sensor 110.

The processor 210 may modify the reference map stored in the memory 220 based on the real-time map. For example, when a change occurs in the surrounding environment of the cleaning robot 1, the processor 210 may apply the real-time map generated by the LiDAR sensor 110 to the reference map or apply a change, which is based on the real-time map and the output of the obstacle sensor 180, to the reference map.

In addition, the processor 210 may control the sensor driver 120 to adjust the height of the LiDAR sensor 110 by raising or lowering the LiDAR sensor 110 according to the surrounding environment of the cleaning robot 1 or the state of the cleaning robot 1, or the processor 210 may turn on or off the power of the LiDAR sensor 110.

The surrounding environment of the cleaning robot 1 may be determined based on at least one of the cleaning map, the output of the bumper sensor 130 or the output of the obstacle sensor 180, and the state of the cleaning robot 1 may include at least one of a standby state, a charging state, an error state, or an operation state.

For example, when the cleaning robot 1 is in the standby state, the charging state, or the error state, the processor 210 may turn off the power of the LiDAR sensor 110 to reduce power consumption. In addition, the processor 210 may turn off power of a rotation motor configured to rotate the LiDAR sensor 110.

An example of the error state will be described. When the cleaning robot 1 is booted, the processor 210 tries raising and lowering the LiDAR sensor 110 a predetermined number of times until the raising and lowering movements of the LiDAR sensor 110 are completed. In this case, when at least one of the movements is not completed, the processor 210 may determine this state as the error state.

When the LiDAR sensor 110 does not reach the second position after controlling the sensor driver 120 to raise the LiDAR sensor 110 from the first position to the second position, or the LiDAR sensor 110 does not reach the first position after controlling the sensor driver 120 to lower the LiDAR sensor 110 from the second position to the first position, occurs more than a predetermined number of times, it may be determined as the error state.

For example, in response to a situation in which a control signal is transmitted to the sensor driver 120 to raise the LiDAR sensor 110 to the second position but the LiDAR sensor 110 does not reach the second position, and the transmission of the control signal is repeated until the LiDAR sensor 110 reaches the second position but the LiDAR sensor 110 does not reach the second position despite three attempts, it may be determined as the error state.

Similarly, in response to a situation in which a control signal is transmitted to the sensor driver 120 to lower the LiDAR sensor 110 to the first position but the LiDAR sensor 110 does not reach the first position, and the transmission of the control signal is repeated until the LiDAR sensor 110 reaches the first position but the LiDAR sensor 110 does not reach the first position despite three attempts, it may be determined as the error state.

Whether the cleaning robot 1 is in the charging state may be determined based on a docking signal transmitted from a docking station or an output of a docking sensor configured to detect a docking terminal of the docking station.

Further, the processor 210 may turn off the power of the LiDAR sensor 110 and the power of the rotation motor when the LiDAR sensor 110 is not operated at the first position. However, when the LiDAR sensor 110 is operated at the first position because the rear cover 20 is formed of a transparent material, the processor 210 may maintain an on-state of the power of the LiDAR sensor 110 and the power of the rotation motor.

When the floor, on which the cleaning robot 1 drives, is inclined, the processor 210 may minimize misrecognition by turning off the power of the rotation motor of the LiDAR sensor 110. The inclination of the floor may be obtained by a gyro sensor provided in the cleaning robot 1.

The processor 210 may control the overall operation of the cleaning robot 1 in addition to the above-described operation. For this, the processor 210 may include at least one of a central processing unit (CPU), an application processor, or a communication processor (CP).

The processor 210 may control hardware or software components connected to the processor 210 by driving an operating system or an application program, and may perform various data processing and operations. In addition, the processor 210 may load and process instructions or data received from at least one of the other components into volatile memory, and store various data in non-volatile memory.

The memory 220 may non-temporarily or temporarily store an operating system (OS) for controlling the overall operation of the components of the cleaning robot 1 and instructions or data related to the components of the cleaning robot 1. The memory 220 is accessed by the processor 210, and reading/writing/modification/deletion/update of data may be performed by the processor 210.

The driving device 30 may provide power for the movement of the main body, that is, the driving of the cleaning robot 1. For example, the driving device 30 may include at least one wheel in contact with the floor surface, a driving motor configured to provide power to the wheels, and a driver configured to operate the driving motor.

The processor 210 may transmit a control signal to the driver of the driving device 30 to move the main body 10.

The cleaning device 50 may perform cleaning of a driving region of the cleaning robot 1 by scattering foreign substances such as dust on the floor and vacuuming the scattered dust. For example, the cleaning device 50 may include a brush module configured to scatter foreign substances such as dust present on the floor and a suction module configured to suction the scattered foreign substances.

The processor 210 may transmit a control signal to the cleaning device 50 to perform cleaning of the driving region of the cleaning robot 1.

The communication device 40 may transmit data to an external device or receive a control command from the external device. For example, when a user transmits a control command for the cleaning robot 1 using a control device such as a remote controller or a mobile device, the communication device 40 may receive the control command, and the processor 210 may perform processing of the received control command.

Hereinafter an operation in which the cleaning robot according to one embodiment lowers or raises the LiDAR sensor 110 according to the surrounding environment will be described in detail.

Figure 6:
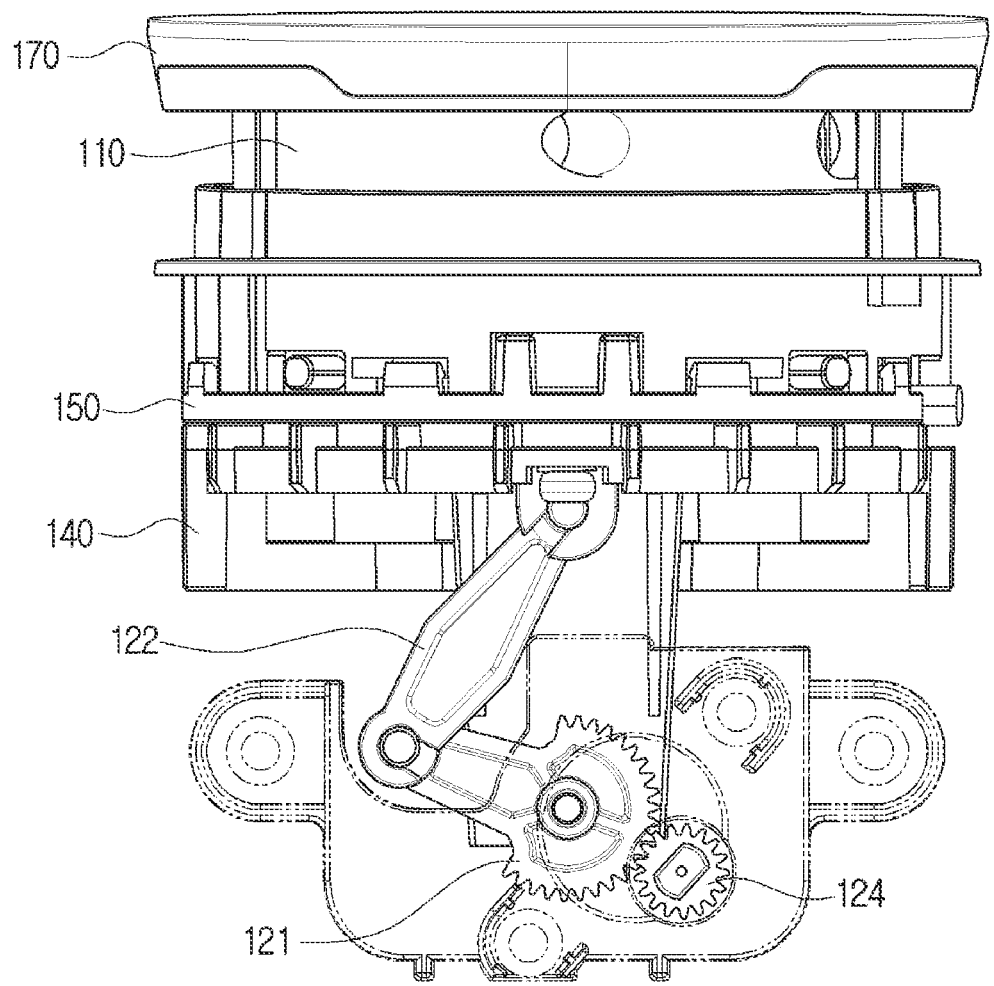
FIGS. 6 and 7 are views illustrating a motion in which the LiDAR sensor provided in the cleaning robot is raised and lowered according to various embodiments of the disclosure.
Figure 7:
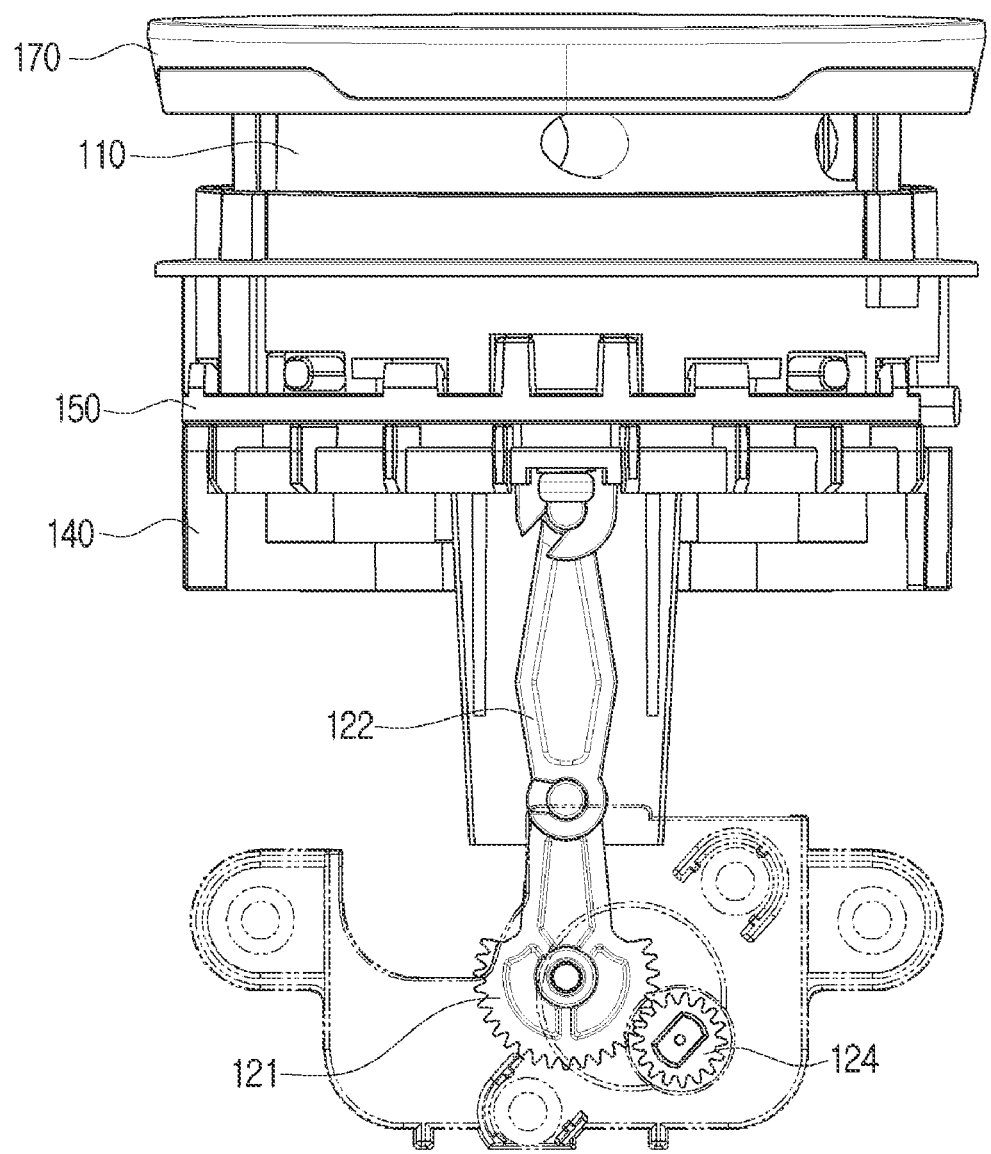

FIGS. 6 and 7 are views illustrating a motion in which the LiDAR sensor provided in the cleaning robot according to an embodiment of the disclosure is raised and lowered. A configuration not relevant to the raising and lowering of the LiDAR sensor is omitted in FIGS. 6 and 7.

Referring to FIGS. 6 and 7, the sensor driver 120 may include a first link 121, a second link 122 and a speed reduction member 124. In addition, although not shown in FIGS. 6 and 7, the sensor driver 120 may include a driving motor 123 (refer to FIG. 5) configured to provide a driving force.

FIG. 6 illustrates a state in which the LiDAR sensor 110 is connected to the sensor driver 120 at the first position (refer to FIG. 1) in which the LiDAR sensor 110 is inserted into the inside of the main body 10 according to an embodiment of the disclosure.

One end of the first link 121 may include teeth, and may be rotated in engagement with teeth formed on the speed reduction member 124. In this case, the speed reduction member 124 may be connected to the driving motor 123 to transmit power received from the driving motor 123 to the first link 121. The driving motor 123 may be a step motor configured to be rotated at a predetermined angle by receiving a current in the form of a pulse.

The other end of the first link 121 may be rotatably connected to one end of the second link 122, and the other end of the second link 122 may be rotatably connected to the LiDAR sensor housing 140.

In this case, the second link 122 connected to the first link 121 may be moved by the rotation of the first link 121, and accordingly, the LiDAR sensor housing 140 connected to the second link 122 may be moved up and down.

FIG. 7 illustrates a state in which the LiDAR sensor is connected to the sensor driver at the second position (refer to FIGS. 2 and 3) in which the LiDAR sensor protrudes to the outside of the main body 10 according to an embodiment of the disclosure.

Referring to FIG. 7, when the first link 121 is rotated, the first link 121 and the second link 122 may be arranged in a straight line with respect to a connection axis of the first link 121 and the second link 122. For example, in comparison with a state in which the LiDAR sensor 110 is at the first position, the first link 121 may be rotated at an angle of approximately 68 degrees. Accordingly, the LiDAR sensor 110 at the second position is positioned higher in comparison with the LiDAR sensor 110 at the first position in FIG. 6.

In the above, the sensor driver 120 has been described as a single step to allow the LiDAR sensor 110 to be moved between two positions such as, the first position and the second position, but is not limited thereto. Therefore, the sensor driver 120 may be configured in multiple operations to allow the LiDAR sensor 110 to be selectively moved between three positions or more.

Figure 8:
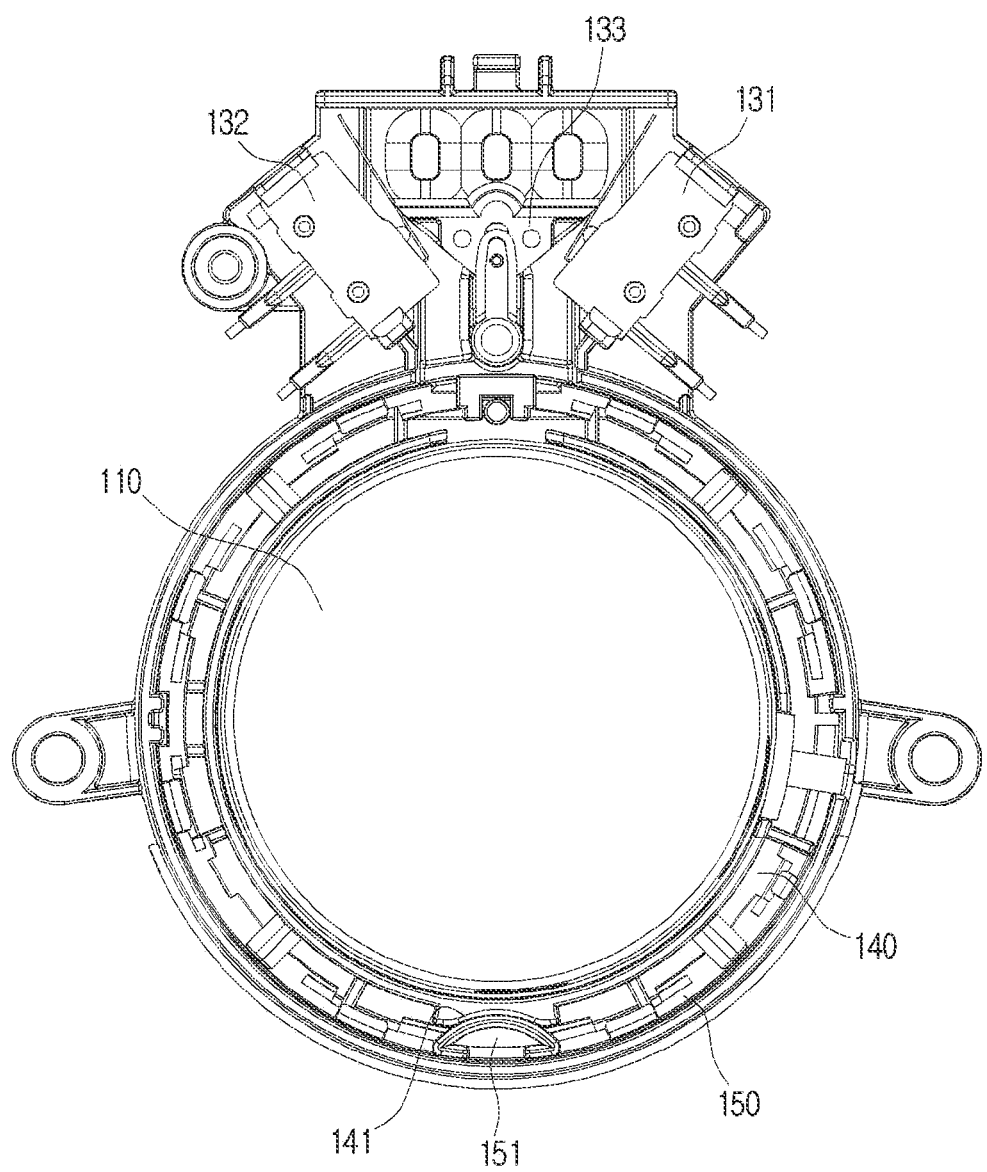
FIG. 8 is a view illustrating a bumper sensor and a bumper member in the cleaning robot according to an embodiment of the disclosure.

FIG. 8 is a view illustrating a bumper sensor and a bumper member in the cleaning robot according to an embodiment of the disclosure.

Referring to FIG. 8, the bumper sensor 130 may include a first bumper sensor 131, a second bumper sensor 132, and a stopper 133. For example, the first bumper sensor 131 and the second bumper sensor 132 may be implemented as micro switches.

The stopper 133 may be disposed adjacent to the contact portion 163 (refer to FIG. 5) of the bumper housing 161, and thus the stopper 133 may transmit a change in the position, which is generated by a movement of the contact portion 163 caused by the impact of the external obstacle or the movement of the LiDAR sensor 110 by the sensor driver 120, to the first and second bumper sensors 131 and 132.

Accordingly, the first and second bumper sensors 131 and 132 may detect whether or not the top cover 170 (refer to FIGS. 3 and 5) is in contact with the obstacle or detect a contact direction, thereby obtaining information on the position of the obstacle and thereby detecting whether the LiDAR sensor 110 is moved to the first position or the second position.

The LiDAR sensor 110 may be accommodated in the LiDAR sensor housing 140. The LiDAR sensor housing 140 may be disposed inside the bumper housing 161 (refer to FIG. 5) and connected to the top cover 170. Accordingly, when the top cover 170 comes into contact with an external obstacle, the position of the LiDAR sensor 110 may be changed inside the bumper housing 161.

The bumper member 150 may be disposed inside the main body 10 to be fixed inside the bumper housing 161. The bumper member 150 may be disposed to surround a circumference of the LiDAR sensor housing 140.

The bumper member 150 may include the guide member 151 provided to protrude in an inward direction. The LiDAR sensor housing 140 may include the guide groove 141 coupled to the guide member 151 at a position corresponding to the guide member 151.

Accordingly, even when the position of the LiDAR sensor housing 140 is changed inside the bumper housing 161, the guide groove 141 of the LiDAR sensor housing 140 may be engaged with the guide member 151 of the bumper member 150 and thus the guide member 151 may guide the LiDAR sensor housing 140 to be moved to an original position of the LiDAR sensor housing 140.

Figure 9:
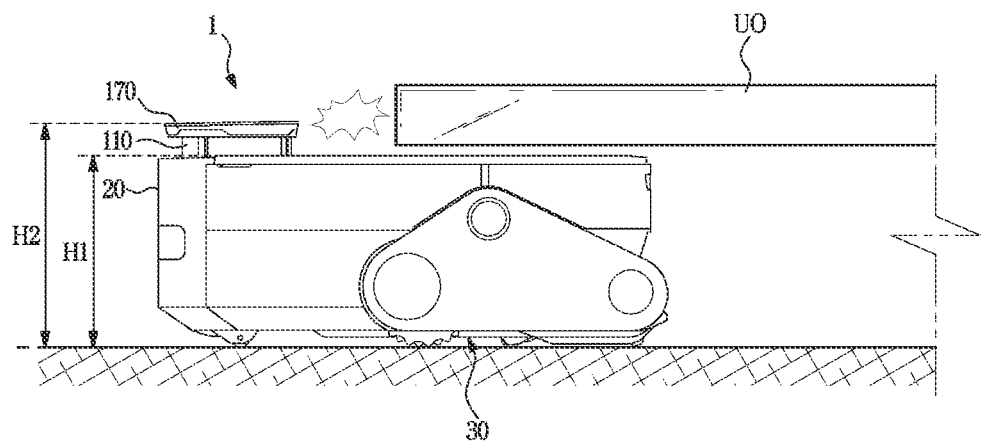
FIGS. 9 and 10 are views illustrating an example in which a height of the LiDAR sensor of the cleaning robot is adjusted according to the surrounding environment according to various embodiments of the disclosure.
Figure 10:
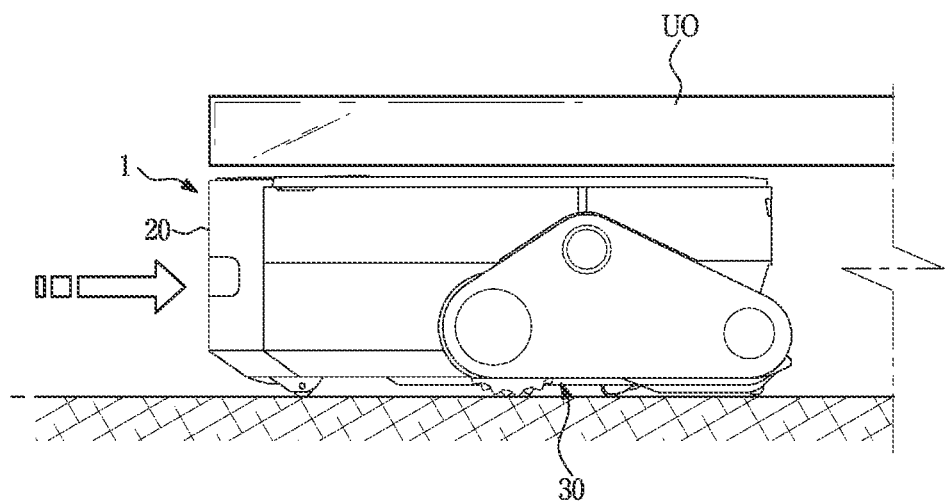

FIGS. 9 and 10 are views illustrating an example in which a height of the LiDAR sensor of the cleaning robot is adjusted according to the surrounding environment according to various embodiments of the disclosure.

At the second position protruding from the upper portion of the main body 10, the LiDAR sensor 110 may recognize the position of the cleaning robot 1 or detect an obstacle during the cleaning robot 1 drives.

Referring to FIGS. 9 and 10, when an upper obstacle UO, which is spaced apart from the floor, is located on a driving path of the cleaning robot 1, the cleaning robot 1 may collide with the upper obstacle UO according to a height of the upper obstacle UO. The height of the upper obstacle UO may mean a distance from the upper obstacle UO to the floor.

The upper obstacle UO may include furniture such as a bed, a table, a chair, a wardrobe, etc., lighting, ornaments, and the like supported by one or more legs or fixed to a ceiling or a wall.

When the height of the upper obstacle UO is less than the height of the main body 10, the main body 10 may collide with the upper obstacle UO. When the LiDAR sensor 110 is inserted into the inside of the main body 10 at the first position, and the top cover 170 of the LiDAR sensor 110 is on the same plane as the upper portion of the main body 10 as described in an example of FIG. 3, the height of the main body 10 is the same as the height H1 of the LiDAR sensor 110 at the second position.

In one embodiment to be described later, between a height of the LiDAR sensor 110 at the first position and a height of the main body 10, the greater height is referred to as a first height H1, and a height of the LiDAR sensor 110 at the second position is referred to as a second height H2.

In this case, because the cleaning robot 1 does not enter a region under the upper obstacle UO, the processor 210 may control the driving device 30 to avoid the upper obstacle UO.

Referring to FIGS. 9 and 10, when a height of the upper obstacle UO is greater than the first height H1 and less than the second height H2, the LiDAR sensor 110 may collide with the upper obstacle UO. However, in this case, because the upper obstacle UO does not collide with the main body 10, the cleaning robot 1 may enter the region under the upper obstacle UO by lowering the LiDAR sensor 110.

Accordingly, the processor 210 may control the sensor driver 120 to lower the LiDAR sensor 110 to the first position. When the LiDAR sensor 110 is lowered to the first position, the processor 210 may control the driving device 30 to allow the cleaning robot 1 to enter the region under the upper obstacle UO, and the processor 210 may control the cleaning device 50 to perform cleaning of the region under the upper obstacle UO.

Whether to lower the LiDAR sensor 110 may be determined based on whether a predetermined time elapses or based on an output of the bumper sensor 130.

When the determination is based on whether the predetermined time elapses, a period of time required for lowering the LiDAR sensor 110 may be predetermined. When the predetermined time elapses after transmitting a control signal to the sensor driver 120, the processor 210 may control the driving device 30 to allow the cleaning robot 1 to enter the region under the upper obstacle UO.

As described above with reference to FIG. 8, the bumper sensor 130 may detect whether the LiDAR sensor 110 is moved to the first position or the second position. Accordingly, when the determination is based on the output of the bumper sensor 130, when the output of the bumper sensor 110 indicates that the LiDAR sensor 110 is moved from the second position to the first position, the processor 210 may control the driving device 30 to allow the cleaning robot 1 to enter the region under the upper obstacle UO.

When the height of the upper obstacle UO is greater than the height H2 of the LiDAR sensor 110 at the second position, the LiDAR sensor 110 as well as the main body 10 may not collide with the upper obstacle UO, and thus the cleaning robot 1 may enter the region under the upper obstacle UO while maintaining the height of the LiDAR sensor 110.

The processor 210 may determine whether to enter the region under the upper obstacle UO based on at least one of the cleaning map, the output of the LiDAR sensor 110, the output of the bumper sensor 130, or the output of the obstacle sensor 180 and adjust the height of the LiDAR sensor 110.

For example, the processor 210 may determine the height of the upper obstacle UO by using the output of the obstacle sensor 180, the output of the bumper sensor 130 and the output of the LiDAR sensor 110, or by using a combination of two or more of the outputs, and the determined height may be recorded on the cleaning map. The height of the upper obstacle UO may be determined not only as a specific value, but also as a range having at least one of an upper limit value or a lower limit value.

Based on the height of the upper obstacle UO recorded on the cleaning map, the processor 210 may control the sensor driver 120 to lower the LiDAR sensor 110 or avoid the upper obstacle UO while maintaining the height of the LiDAR sensor 110, or enter the region under the upper obstacle UO.

The processor 210 may control the sensor driver 120 to lower the LiDAR sensor 110 when the height of the upper obstacle UO positioned in front of the cleaning robot 1 is included in a reference range. The reference range may be a range exceeding the first height H1 and being less than or equal to the second height H2. When the height of the upper obstacle UO exceeds the first height H1 and is less than or equal to the second height H2, the processor 210 may control the sensor driver 120 to lower the LiDAR sensor 110.

When the height of the upper obstacle UO is equal to or less than the first height H1, the processor 210 may perform avoidance driving for the upper obstacle UO, and when the height of the upper obstacle UO exceeds the second height H2, the processor 210 may enter the region under the upper obstacle UO and perform cleaning of the region while maintaining the LiDAR sensor 110 at the second position.

In addition, when the cleaning map is not generated or information about the height of the upper obstacle UO is not recorded in the cleaning map, the processor 210 may determine the height of the upper obstacle UO in real-time by using the output of the obstacle sensor 180, the output of the bumper sensor 130 and the output of the LiDAR sensor 110, or by using a combination of two or more of the outputs, and may use the determined height for controlling the sensor driver 120.

For example, when the LiDAR sensor 110 is provided at the rear of the main body 10 as shown in FIGS. 9 and 10, it is also possible to use only the output of the bumper sensor 130. In the structure in which the LiDAR sensor 110 is provided on the main body 10, the bumper sensor 130 may detect an impact applied from the front of the LiDAR sensor 110 when the front portion of the main body 10 enters the region under that upper obstacle UO.

Accordingly, when the output of the bumper sensor 130 indicates a collision between the LiDAR sensor 110 and an obstacle located in front, the processor 210 may control the sensor driver 120, the driving device 30, and the cleaning device 50 so as to lower the LiDAR sensor 110 and perform cleaning while driving on the region under that upper obstacle UO.

Figure 11:
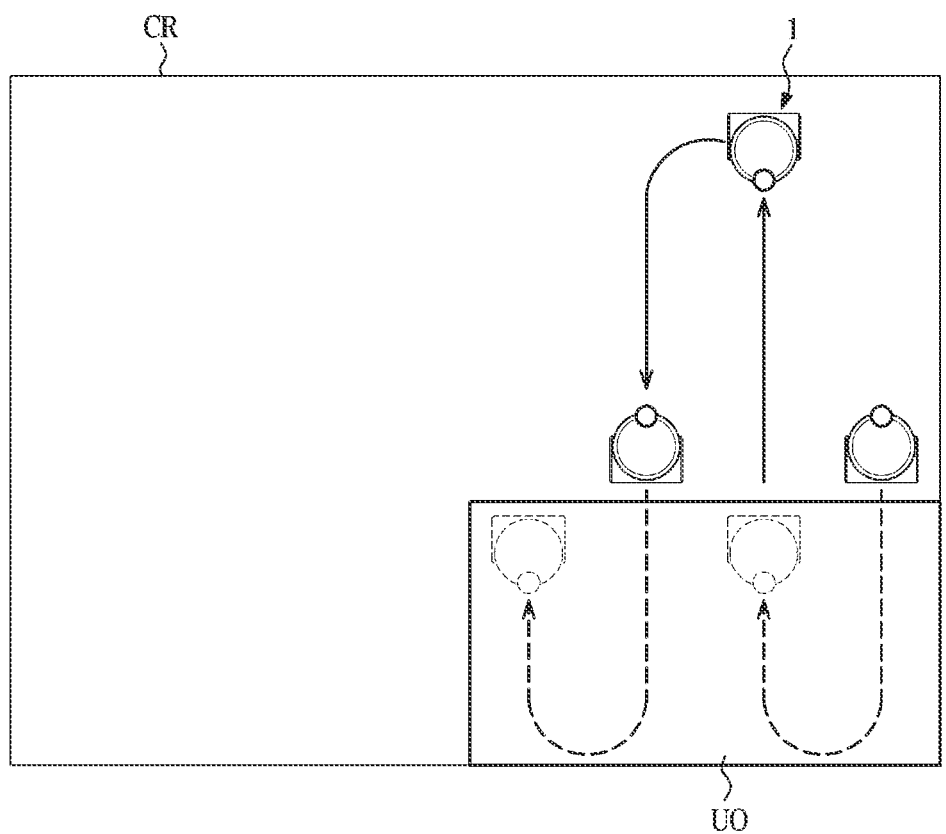
FIGS. 11 and 12 are views illustrating an example of a path in which the cleaning robot cleans a region under an upper obstacle according to various embodiments of the disclosure.
Figure 12:
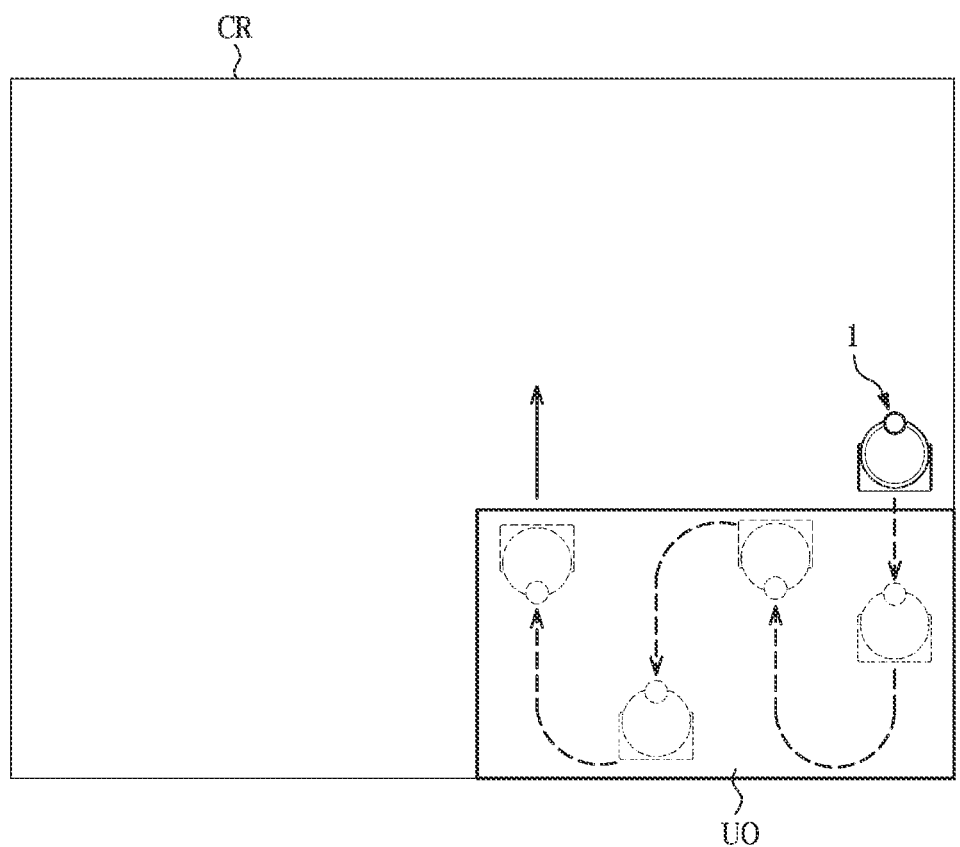

FIGS. 11 and 12 are views illustrating an example of a path in which the cleaning robot cleans a region under an upper obstacle according to various embodiments of the disclosure.

Referring to FIGS. 11 and 12, the height of the upper obstacle UO is greater than the upper portion of the main body 10 and less than the height of the LiDAR sensor 110 at the second position, it is possible to lower the LiDAR sensor 110 of the cleaning robot 1 and thus the cleaning robot 1 may enter the region under the upper obstacle UO and perform cleaning thereof.

When the cleaning robot 1 drives in a zigzag path, the cleaning robot 1 may enter the region under the upper obstacle UO, turn once, and then drive in a straight line to an outer region, and thus the cleaning robot 1 may repeatedly deviate from the region under the upper obstacle UO and re-enter the region under the upper obstacle UO, as shown in FIG. 11. Alternatively, as shown in FIG. 12, the cleaning robot 1 may deviate from the region under the upper obstacle UO after cleaning of the region under the upper obstacle UO.

In the case of driving as shown in FIG. 11, the cleaning robot 1 may raise and lower the LiDAR sensor 110 by determining both deviation and re-entering the region under the upper obstacle UO, and the cleaning robot 1 may maintain a lower state of the LiDAR sensor 110 regardless of the deviation and re-entering of the region under the upper obstacle UO.

The LiDAR sensor 110 does not operate in the region under the upper obstacle UO, because the LiDAR sensor 110 is inserted into the main body 10. Accordingly, the driving in the region under the upper obstacle UO may be performed based on the cleaning map and odometry. In order to use the odometry, an inertial sensor or an encoder provided in the cleaning robot 1 may be used. However, when the rear cover 20 is formed of a transparent material, the output of the LiDAR sensor 110 may also be used.

The processor 210 may determine whether cleaning of the region under the upper obstacle UO is completed based on the cleaning map and odometry. Determination of whether cleaning is completed may be performed based on the cleaning map and odometry, and thus in response to determining that the cleaning robot 1 drives the entire region under the upper obstacle UO while cleaning thereof based on the cleaning map and odometry, the processor 210 may determine that the cleaning of the region under the upper obstacle UO is completed.

In response to determining that the cleaning of the region under the upper obstacle UO is completed, the processor 210 may control the driving device 30 and the sensor driver 120 to allow the cleaning robot 1 to deviate from the region under the upper obstacle UO and to raise the LiDAR sensor 110 from the first position to the second position, again.

When the LiDAR sensor 110 does not reach the second position after the processor 210 transmits a control signal to the sensor driver 120 to raise the LiDAR sensor 110 to the second position. When the attempt to raise the LiDAR sensor 110 fails, it may be considered that the cleaning robot 1 does not yet deviate from the region under the upper obstacle UO. Whether the LiDAR sensor 110 reaches the second position may be determined based on the output of the bumper sensor 130. Thus, the processor 210 may control the sensor driver 120 to lower the LiDAR sensor 110 to the first position, again.

The cleaning robot 1 may additionally move to deviate from the region under the upper obstacle UO, and thus the cleaning robot 1 may move forward while maintaining a current driving direction or changing a driving direction. The cleaning robot 1 may perform cleaning or may not perform cleaning while being moved to deviate from the region under the upper obstacle UO.

When the processor 210 determines that the cleaning robot 1 deviates from the region under the upper obstacle UO based on the cleaning map and odometry after the additional movement for deviating from the region under the upper obstacle UO, the processor 210 may control the sensor driver 120 to raise the LiDAR sensor 110 to the second position.

Alternatively, it is possible to further use the output of the obstacle sensor 180 for determining whether the cleaning robot 1 deviates from the region under the upper obstacle UO. The processor 210 may repeat the above-described operation until the cleaning robot 1 deviates from the region under the upper obstacle UO, and when the deviation is completed, the processor 210 may turn on the power of the LiDAR sensor 110 and the power of the rotation motor again.

Meanwhile, the cleaning of the region under the upper obstacle UO may be performed after the cleaning of the outer region is completed, or may be performed prior to the cleaning of the outer region. There is no limitation on the order of cleaning between the region under the upper obstacle UO and the outer region of the upper obstacle UO.

Figure 13:
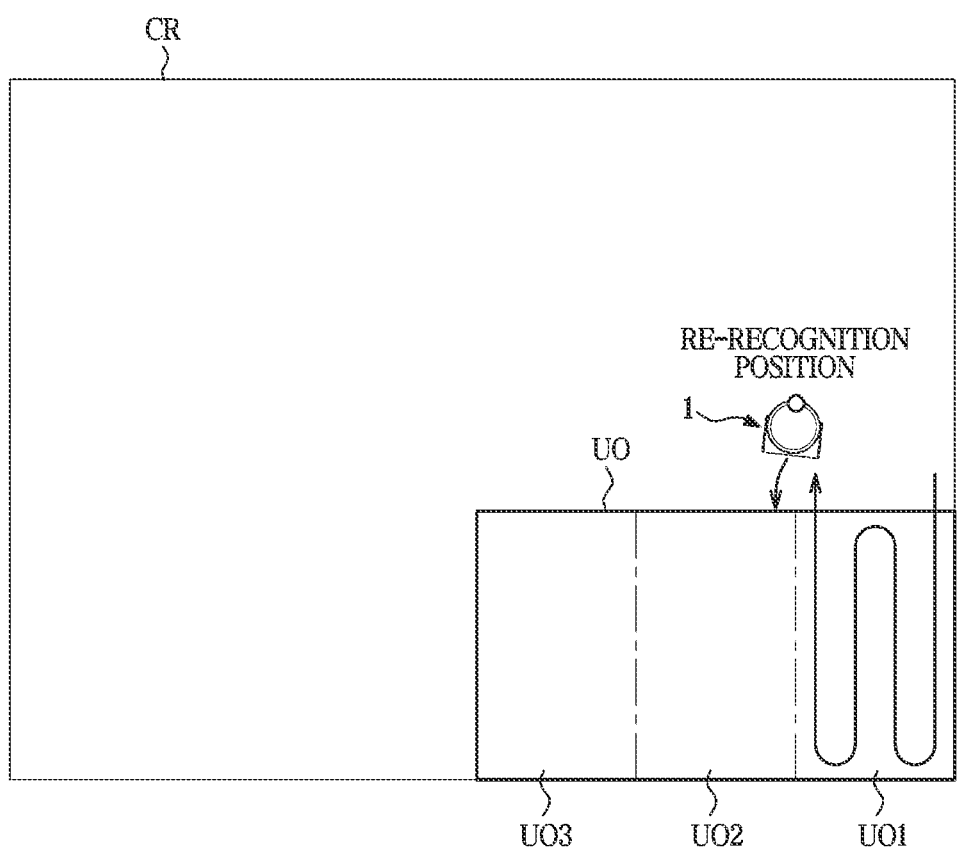
FIGS. 13 and 14 are views illustrating another example of the path in which the cleaning robot cleans the region under the upper obstacle according to various embodiments of the disclosure.
Figure 14:
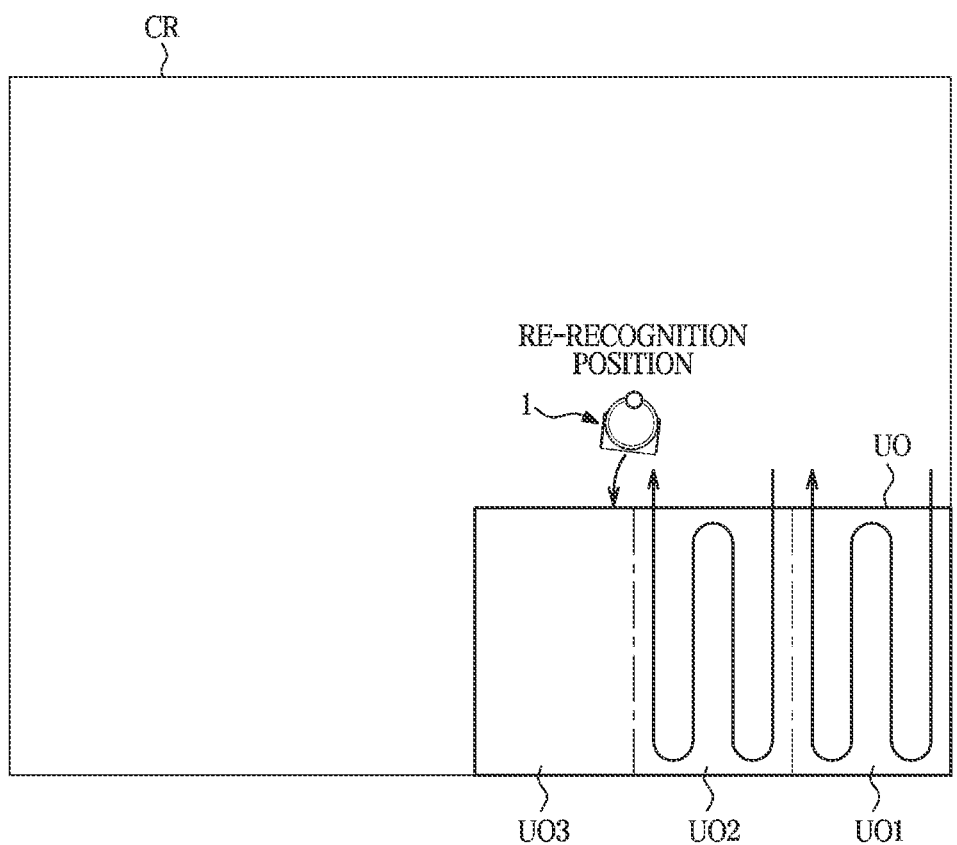

FIGS. 13 and 14 are views illustrating another example of the path in which the cleaning robot cleans the region under the upper obstacle according to various embodiments of the disclosure.

While the LiDAR sensor 110 is lowered to the first position, the cleaning robot 1 may not recognize a position of the cleaning robot 1 while driving. When the cleaning robot 1 drives without recognizing the position thereof, the position of the cleaning robot 1 may shift from a driving path due to slippage or bumping into an obstacle, etc., but it is difficult for the cleaning robot 1 to recognize the shift and to make the necessary corrections.

Accordingly, the cleaning robot 1 may set a virtual wall in the region under the upper obstacle UO to divide the region under the upper obstacle UO into a plurality of sub-regions. The cleaning robot 1 may deviate from the region under the upper obstacle UO each time cleaning of one of the plurality of sub-regions is completed, and re-recognize a position of the cleaning robot 1 and then re-enter the region under the upper obstacle UO. Accordingly, the shifted position of the cleaning robot 1 may be corrected.

Referring to FIG. 13, the processor 210 may divide the region under the upper obstacle UO into three sub-regions UO1, UO2, and UO3. The cleaning robot 1 may lower the LiDAR sensor 110 to the first position, enter the first sub-region UO1 to perform cleaning, and when that the cleaning of the first sub-region UO1 is completed, the cleaning robot 1 may deviate from the region under the upper obstacle UO and raise the LiDAR sensor 110 to the second position and then turn on the power that is turned off.

The processor 210 may re-recognize the position of the cleaning robot 1 based on the output of the LiDAR sensor 110. Accordingly, even when the position of the cleaning robot 1 at the first sub-region UO1 is shifted, the processor 210 may correct the position of the cleaning robot 1. When the re-recognition of the position is completed, the processor 210 may control the sensor driver 120 and the driving device 30 to lower the LiDAR sensor 110 to the first position, again and to enter the second sub-region UO2.

When the cleaning of the second sub-region UO2 is completed, the cleaning robot 1 may deviate from the region under the upper obstacle UO and raise the LiDAR sensor 110 to the second position and then turn on the power that is turned off.

When the re-recognition of the position is completed, the processor 210 may control the sensor driver 120 and the driving device 30 to lower the LiDAR sensor 110 to the first position, again and to enter the third sub-region UO3.

Further, the processor 210 may determine the number of sub-regions based on the driving environment of the region under the upper obstacle UO. For example, before the cleaning robot 1 enters the region under the upper obstacle UO, the processor 210 may determine the driving environment of the region under the upper obstacle UO based on the output of the obstacle sensor 180.

Alternatively, before the cleaning robot 1 enters the region under the upper obstacle UO, the processor 210 may divide the region under the upper obstacle UO by the number determined by default, and adjust the number of sub-regions based on information that is collected while the cleaning robot 1 drives in at least one sub-region.

For example, the processor 210 may determine the type of the floor in the region under the upper obstacle UO based on an output of a floor detection sensor provided in the cleaning robot 1, and the processor 201 may re-divide the region under the upper obstacle UO by increasing the number of sub-regions when the type of the floor is a material such as a carpet that causes the cleaning robot 1 to slip.

As another example, the processor 210 may adjust the number of sub-regions based on the output of the obstacle sensor 180.

Alternatively, the processor 210 may not divide the region under the upper obstacle UO before the cleaning robot 1 enters the region under the upper obstacle UO. The processor 210 may instead divide the region under the upper obstacle UO based on the information obtained by the floor detection sensor or the obstacle sensor 180 while the cleaning robot 1 drives in the region under the upper obstacle UO.

Hereinafter one embodiment in which the obstacle sensor 180 of the cleaning robot 1 obtains data regarding a size of the obstacle will be described.

When the obstacle sensor 180 includes a 3D sensor or an optical pattern sensor, the obstacle sensor 180 may obtain 2D information or 3D information about an object. Information about the size, such as the height, width, area, etc. of the obstacle may be obtained by the obstacle sensor 180. However, the 3D sensor and the optical pattern sensor are only examples applied to the embodiment of the cleaning robot 1, and as long as capable of obtain information on the size of the obstacle, the obstacle sensor 180 may include other sensors other than a 3D sensor or an optical pattern sensor.

In one embodiment to be described below, for the detailed description, a case in which the obstacle sensor includes a 3D sensor will be described as an example.

Figure 15:
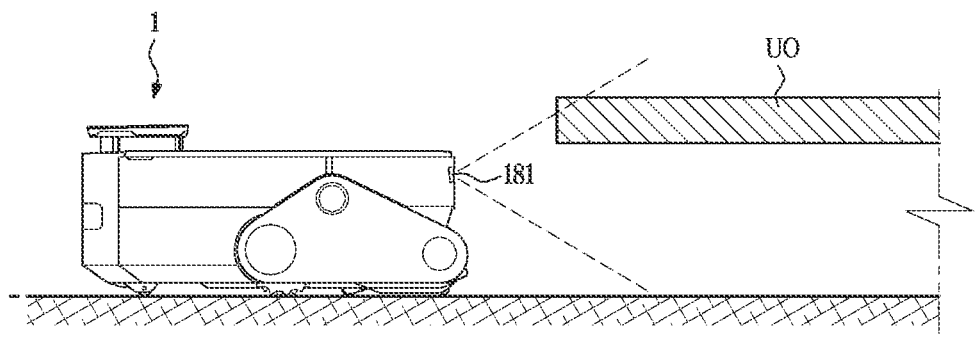
FIGS. 15 to 17 are views illustrating an example of information that is obtained when the cleaning robot includes a 3 dimensional (3D) sensor according to various embodiments of the disclosure.
Figure 16:
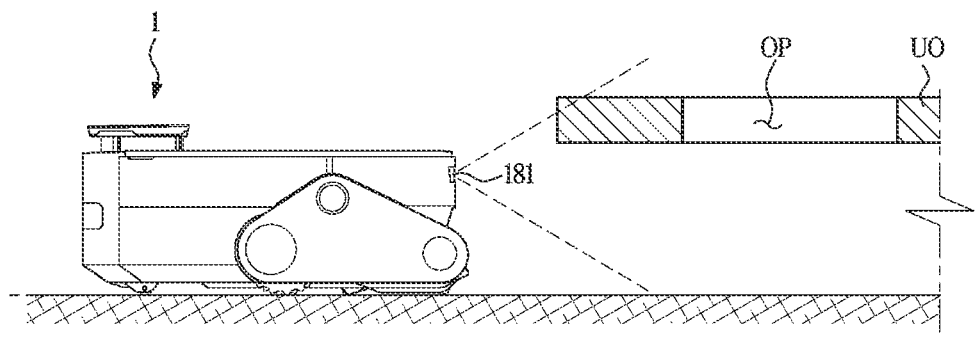
Figure 17:
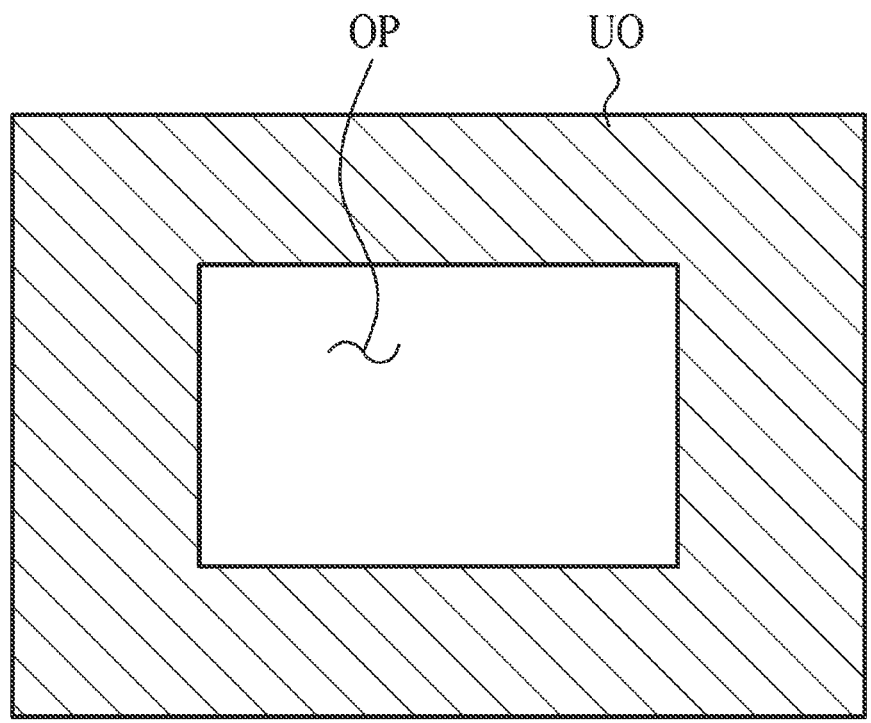

FIGS. 15 to 17 are views illustrating an example of information that is obtained when the cleaning robot includes a 3D sensor according to various embodiments of the disclosure.

Referring to FIG. 15, a 3D sensor 181 may be provided on the front side of the main body 10 to detect an obstacle positioned in front of the cleaning robot 1. Unlike the LiDAR sensor 110, the 3D sensor 181 has a constant field of view (FOV) in a vertical direction. Therefore, even when an obstacle is not located at the same height as the 3D sensor 181, the 3D sensor may detect the obstacle when the obstacle is in the FOV range.

Further, the 3D sensor 181 may obtain information about a height, width, or depth of an obstacle included in the FOV range. Accordingly, the processor 210 may calculate the height and width of the upper obstacle UO positioned in front of the cleaning robot 1 based on the output of the 3D sensor 181, and record the calculated height and width in the cleaning map.

Accordingly, while the cleaning robot 1 drives, the processor 210 may determine the presence and height of the upper obstacle UO based on the cleaning map. The processor 210 may determine whether to enter the region under the upper obstacle UO based on the determination result, and may adjust the height of the LiDAR sensor 110.

Alternatively, the processor 210 may use both the cleaning map and the output of the 3D sensor 181. If the cleaning map is not generated, the processor 210 may use only the output of the 3D sensor 181.

Particularly, in response to a state in which the upper obstacle UO is located in the front while the cleaning robot 1 drives, and the height of the upper obstacle UO exceeds the first height H1 and is less than or equal to the second height H2, the processor 210 may control the sensor driver 120 to lower the LiDAR sensor 110 to the first position.

Further, the processor 210 may also determine information on the upper obstacle UO based on the output of the 3D sensor 181. Referring to FIGS. 16 and 17, when a partial portion of the upper obstacle UO is open, the processor 210 may determine that the partial portion of the upper obstacle UO is open based on the output of the 3D sensor 181, and record information on the open portion in the cleaning map.

The cleaning robot 1 that cleans the region under the upper obstacle UO may raise the LiDAR sensor 110 to the second position again in a region under the open portion OP.

The processor 210 may determine whether to enter the region under the open portion OP based on the cleaning map, and may raise the LiDAR sensor 110 according to the determination result. The processor 210 may raise the LiDAR sensor 110 after the cleaning robot 1 enters the region under the open portion OP. In addition, the processor 210 may recognize the current position of the cleaning robot 1 by turning on the power of the LiDAR sensor 110 and the power of the rotation motor. Accordingly, even in the region under the upper obstacle UO, cleaning may be reliably performed without departing from the path.

However, when the size of the upper obstacle UO is large, there may be a limit in sensing the inner portion of the upper obstacle UO from the outside. Accordingly, when the size of the upper obstacle UO being equal to or greater than a reference value, the processor 210 may control the sensor driver 120 to attempt to raise the LiDAR sensor 110 in a portion that is not determined as the open portion OP.

When the LiDAR sensor 110 does not reach the second position even when a control signal is transmitted to the sensor driver 120, the portion may be determined as a portion in which the LiDAR sensor 110 is not allowed to be raised and thus the LiDAR sensor 110 may maintain the first position. Whether the LiDAR sensor 110 reaches the second position may be determined based on the output of the bumper sensor 130.

Alternatively, the processor 210 may determine the open portion OP based on the output of the 3D sensor 181 in the region under of the upper obstacle UO.

The processor 210 may determine whether the cleaning robot 1 enters a region under a closed portion of the upper obstacle UO based on at least one of the cleaning map, the output of the LiDAR sensor 110, the output of the bumper sensor 130, or the output of the 3D sensor 181. In response to determining that the cleaning robot 1 enters the region under the closed portion, the processor 210 may lower the LiDAR sensor 110 to the first position, again. The LiDAR sensor 110 is lowered before the cleaning robot 1 re-enters the region under the closed portion. At this time, the processor 210 may turn off the power of the LiDAR sensor 110 and the power of the rotation motor.

When the cleaning robot 1 includes the 3D sensor 181, the processor 210 may detect the upper obstacle UO in the region under the upper obstacle UO and may determine whether the cleaning robot 1 deviates from the upper obstacle UO. Even when the 3D sensor 181 is not provided, the processor 210 may determine whether the cleaning robot 1 deviates from the upper obstacle UO based on the cleaning map and odometry, but when the 3D sensor 181 is provided, the processor 210 may accurately determine whether the cleaning robot 1 deviates from the upper obstacle UO based on the output of the 3D sensor 181. In this case, the cleaning map and odometry information may be used together.

The description of the driving path of FIGS. 11 to 14 may be applied to the state in which the 3D sensor 181 is provided in the cleaning robot 1, and in this case, the processor 210 may accurately determine whether the cleaning robot 1 deviates from the upper obstacle UO based on the output of the 3D sensor 181, and thus it is possible to perform more efficient and accurate cleaning of the region under the upper obstacle UO.

Hereinafter a method for controlling the cleaning robot according to one embodiment will be described. In implementing the control method of the cleaning robot according to one embodiment, the above-described cleaning robot 1 may be used. Accordingly, the description described above with reference to FIGS. 1 to 17 may be equally applied to one embodiment of the control method of the cleaning robot.

Figure 18:
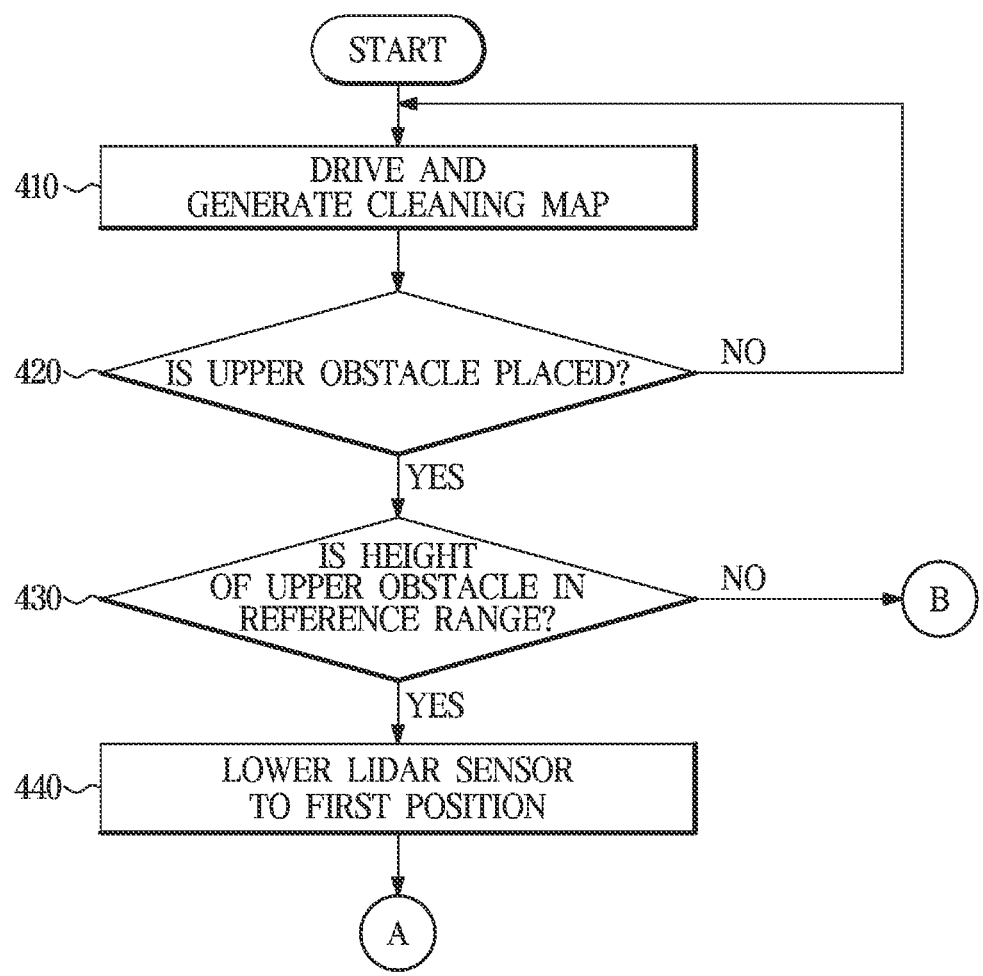
FIG. 18 is a flowchart illustrating a control method of the cleaning robot according to an embodiment of the disclosure.

FIG. 18 is a flowchart illustrating a control method of the cleaning robot according to an embodiment of the disclosure.

Referring to FIG. 18, when a cleaning command is input and cleaning is started, the cleaning robot 1 may generate the cleaning map while driving in operation 410. The processor 210 may control the driving device 30 to drive the cleaning robot 1, the LiDAR sensor 110 may obtain information for recognizing the position of the cleaning robot 1 at the second position, and the obstacle sensor 180 may obtain information on obstacles around the cleaning robot 1. For example, when the obstacle sensor 180 includes the 3D sensor 181 or the optical pattern sensor, the processor 210 may determine the height of the upper obstacle UO based on the output of the obstacle sensor 180. Because the description of generating the cleaning map is the same as that described above in the embodiment of the cleaning robot 1, a detailed description thereof will be omitted.

When an upper obstacle spaced from the floor is located in front of the cleaning robot 1 (yes in operation 420) and when a height of the upper obstacle is included in a reference range (yes in operation 430), the processor 220 may lower the LiDAR sensor 110 to the first position in operation 440. Information on the presence of the upper obstacle UO and the height of the upper obstacle UO may be determined based on at least one of the cleaning map, the output of the LiDAR sensor, or the output of the obstacle sensor. The processor 210 may transmit a control signal to the sensor driver 120 to lower the LiDAR sensor 110.

Alternatively, in order to adjust the height of the LiDAR sensor 110, the processor 210 may use the output of the bumper sensor 130 together with the cleaning map. In addition, in a state in which the cleaning map is not generated, or information on the height of the upper obstacle UO is not recorded on the cleaning map, the processor 210 may determine the height of the upper obstacle UO in real time by using the output of the obstacle sensor 180, the output of the bumper sensor 130 and the output of the LiDAR sensor 110, or by using a combination of two or more of the outputs, and the processor 210 may use the determined height to control the sensor driver 120.

For example, when the LiDAR sensor 110 is provided at the rear of the main body 10 as shown in FIGS. 9 and 10, the processor 210 may use only the output of the bumper sensor 130. Particularly, in the structure in which the LiDAR sensor 110 is provided on the main body 10, the bumper sensor 130 may detect an impact applied from the front of the LiDAR sensor 110 when the front portion of the main body 10 already enters the region under that upper obstacle UO.

Accordingly, when the output of the bumper sensor 130 indicates a collision between the LiDAR sensor 110 and an obstacle located in front, the processor 210 may lower the LiDAR sensor 110.

Figure 19:
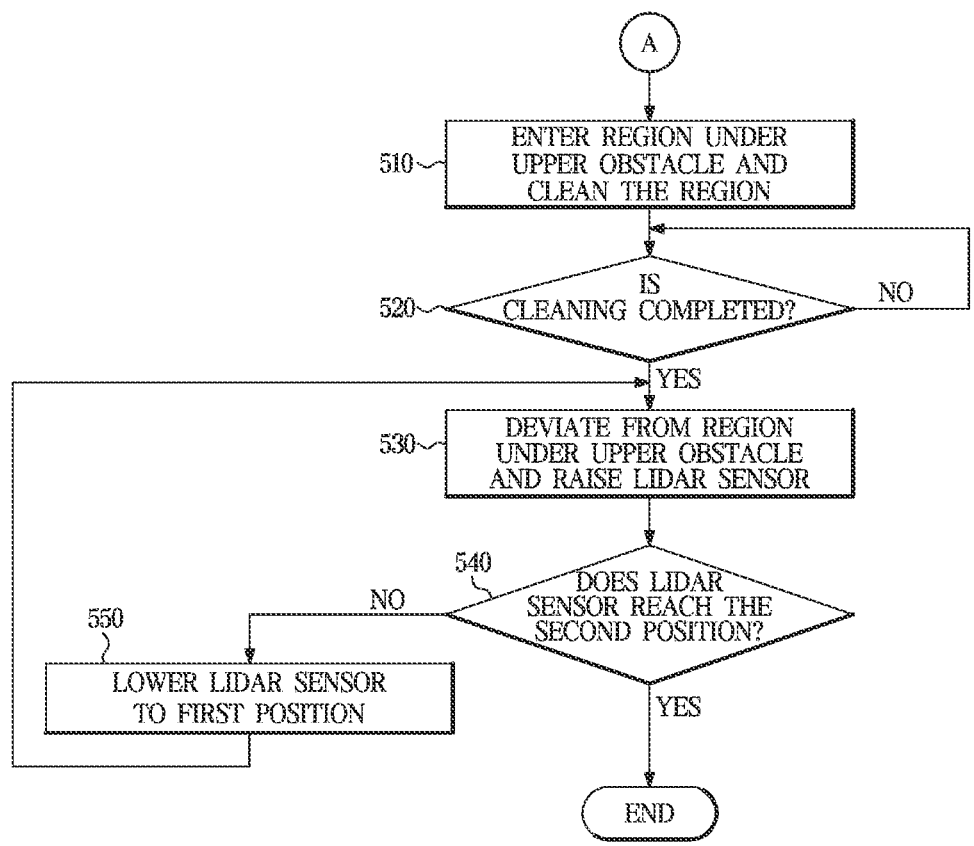
FIG. 19 is a flowchart illustrating a process after the cleaning robot enters the region under the upper obstacle in the control method of the cleaning robot according to an embodiment of the disclosure.

FIG. 19 is a flowchart illustrating a process after the cleaning robot enters the region under the upper obstacle in the control method of the cleaning robot according to an embodiment of the disclosure.

Referring to FIG. 19, when the LiDAR sensor 110 is lowered to the first position in operation 440, the cleaning robot 1 enters the region under the upper obstacle UO to perform cleaning in operation 510. For this, the processor 210 may transmit a control signal to the driving device 30 and the cleaning device 50.

In addition, the processor 210 may turn off the power of the LiDAR sensor 110 and the power of the rotation motor in order to reduce power consumption.

When the cleaning of the region under the upper obstacle is completed (yes in operation 520), the cleaning robot 1 deviates from the region under the upper obstacle UO and raise the LiDAR sensor in operation 530. The processor 210 may determine whether cleaning of the region under the upper obstacle UO is completed based on the cleaning map and odometry. The processor 210 may transmit a control signal to the driving device 3 to allow the cleaning robot 1 to deviate from the region under the upper obstacle UO and may transmit a control signal to the sensor driver 120 to attempt to raise the LiDAR sensor 110. The movement for deviating from the region under the upper obstacle UO may also be performed based on the cleaning map and odometry.

When the LiDAR sensor does not reach the second position even when the processor 210 transmits the control signal to the sensor driver 120 (no in operation 540), the processor 210 may lower the LiDAR sensor to the first position, again in operation 550. As mentioned above, when the attempt to raise the LiDAR sensor 110 is tried but fails, it may be seen that the cleaning robot 1 does not yet deviate from the region under the upper obstacle UO. Whether the LiDAR sensor 110 reaches the second position may be determined based on the output of the bumper sensor 130. The cleaning robot 1 may be moved to deviate from the region under the upper obstacle UO and attempt to raise the LiDAR sensor 110. For a further movement, the cleaning robot 1 may be moved forward while maintaining a current driving direction or moved while changing the current driving direction.

The same processes may be repeated until the cleaning robot 1 actually deviates from the region under the upper obstacle UO.

When the LiDAR sensor 110 reaches the second position (yes in operation 540), it may be seen that the cleaning robot 1 deviates from the region under the upper obstacle UO. Accordingly, the cleaning robot 1 may perform cleaning on another cleaning region or return to the docking station for charging.

Figure 20:
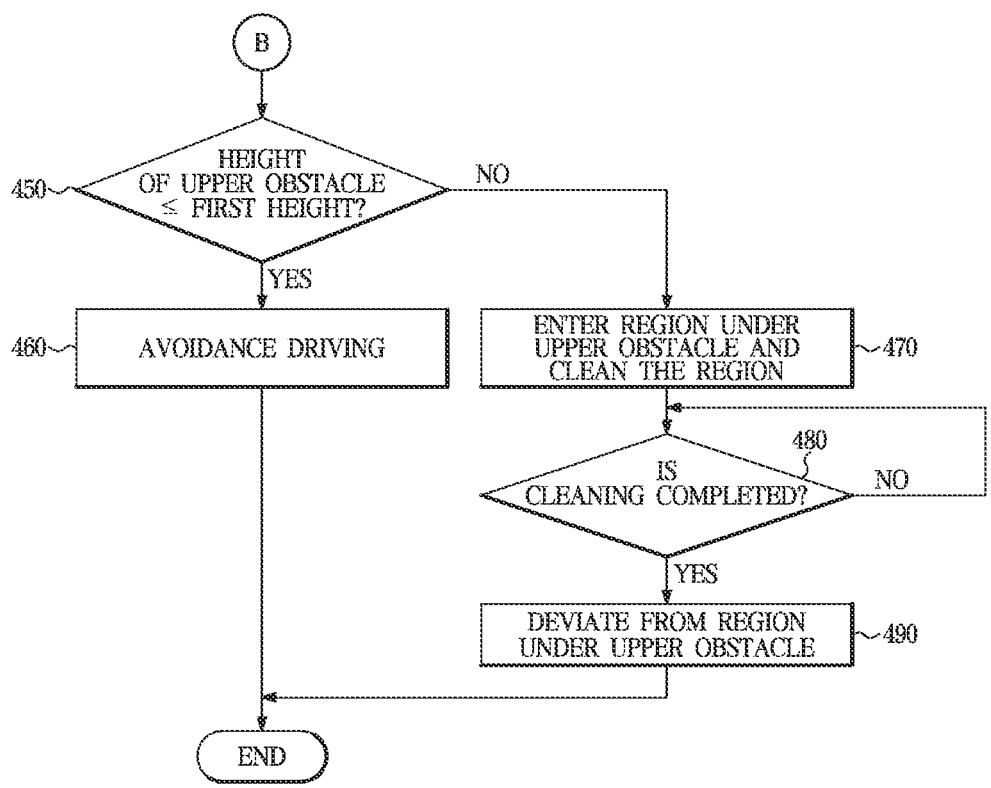
FIG. 20 is a flowchart illustrating a process of controlling a driving of the cleaning robot according to a height of the upper obstacle in the control method of the cleaning robot according to an embodiment of the disclosure.

FIG. 20 is a flowchart illustrating a process of controlling a driving of the cleaning robot according to a height of the upper obstacle in the control method of the cleaning robot according to an embodiment of the disclosure.

Referring to FIG. 20, when the height of the upper obstacle is not included in the reference range (no in operation 430), and when the height of the upper obstacle is less than or equal to the first height H1 (yes in operation 450), the cleaning robot 1 may not enter the region under the upper obstacle UO and thus may perform avoidance driving in operation 460.

When the height of the upper obstacle exceeds the first height H1 (no in operation 450), the cleaning robot 1 may enter the region under the upper obstacle UO while the LiDAR sensor 110 is at the second position. Accordingly, while maintaining the height of the LiDAR sensor 110, the processor 210 may control the driving device 30 and the cleaning device 50 to enter the region under the upper obstacle UO and perform cleaning thereof in operation 470.

When the cleaning is completed (yes in operation 480), the processor may control the driving device to deviate from the region under the upper obstacle in operation 490. When an external region to be cleaned remains, the cleaning robot 1 may perform the remaining cleaning and when the cleaning of the entire cleaning region is completed, the cleaning robot 1 may return to the docking station.

Figure 21:
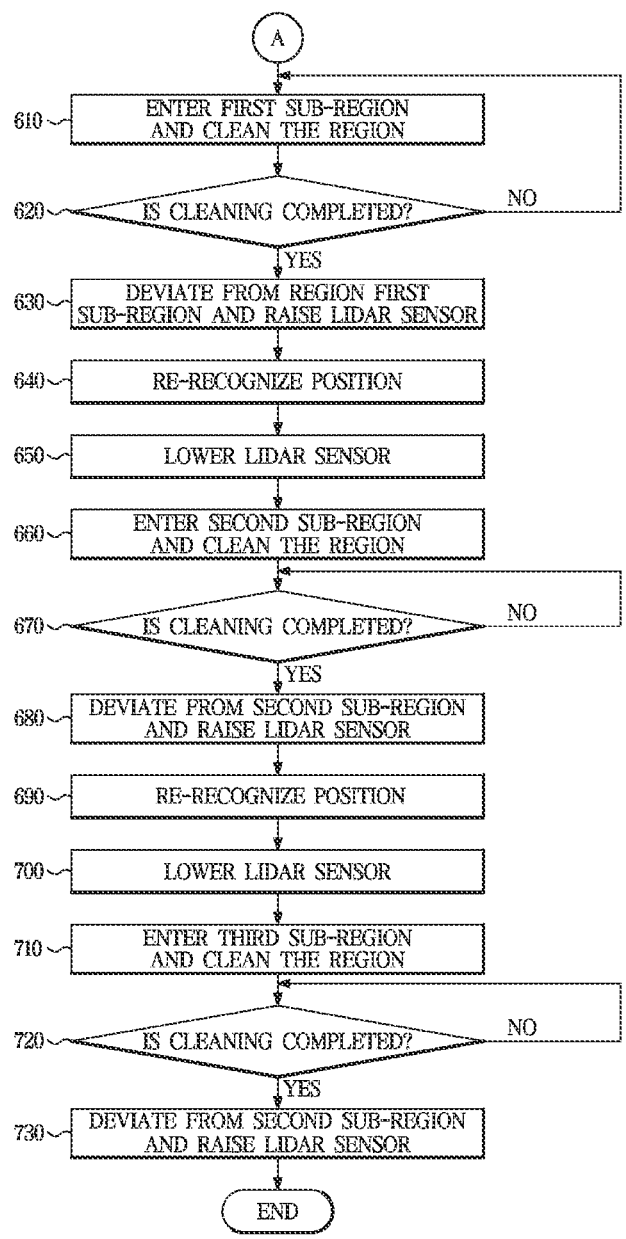
FIG. 21 is a flowchart illustrating an embodiment of performing cleaning by dividing the region under the upper obstacle into a plurality of sub-regions in the control method of the cleaning robot according to an embodiment of the disclosure.

FIG. 21 is a flowchart illustrating an embodiment of performing cleaning by dividing the region under the upper obstacle into a plurality of sub-regions in the control method of the cleaning robot according to an embodiment of the disclosure.

Referring to FIG. 21, the cleaning robot 1 may set a virtual wall in the region under the upper obstacle UO to divide the region under the upper obstacle UO into the plurality of sub-regions. The cleaning robot 1 may deviate from the region under the upper obstacle UO each time cleaning of one of the plurality of sub-regions is completed, and re-recognize a position of the cleaning robot 1 and then re-enter the region under the upper obstacle UO. A case in which the region under the upper obstacle UO is divided into three sub-regions will be described as an example.

When the LiDAR sensor 110 is lowered to the first position in front of the upper obstacle UO in operation 440, the processor may control the driving device and the cleaning device to enter the first sub-region and perform cleaning thereof in operation 610. At this time, the processor 210 may turn off the power of the LiDAR sensor 110 and the rotation motor.

When the cleaning of the first sub-region is completed (yes in operation 620), the processor may control the driving device to deviate from the first sub-region, and control the sensor driver to raise the LiDAR sensor operation 630. In addition, because the processor 210 turns off the LiDAR sensor 110 and the rotation motor upon entering the first sub-region UO1, the processor 210 may turn on the power, which is turned off, again while raising the LiDAR sensor 110.

The LiDAR sensor 110, in which the power is turned on, may collect information for recognizing the position of the cleaning robot 1 again at the second position, and the processor 210 may re-recognize the position of the cleaning robot 1 based on the output of the LiDAR sensor 110 in operation 640. Accordingly, the processor 210 may correct the shift even when the position of the cleaning robot 1 is shifted due to slippage or collision with an obstacle in the first sub-region UO1.

When the re-cognition of the position is completed, the processor 210 may lower the LiDAR sensor 110 again in operation 650, and control the driving device 30 and the cleaning device 50 to enter the second sub-region UO2 and perform cleaning thereof in operation 660.

When the cleaning of the second sub-region is completed (yes in operation 670), the processor 210 may control the driving device 30 to deviate from the second sub-region UO2, and control the sensor driver 120 to raise the LiDAR sensor 110 in operation 680. In addition, because the processor 210 turns off the LiDAR sensor 110 and the rotation motor upon entering the second sub-region UO2, the processor 210 may turn on the power, which is turned off, again while raising the LiDAR sensor 110.

The LiDAR sensor 110, in which the power is turned on, may collect information for recognizing the position of the cleaning robot 1 again at the second position, and the processor 210 may re-recognize the position of the cleaning robot 1 based on the output of the LiDAR sensor 110 in operation 690.

When the re-cognition of the position is completed, the processor 210 may lower the LiDAR sensor 110 again in operation 700, and control the driving device 30 and the cleaning device 50 to enter the third sub-region UO3 and perform cleaning thereof in operation 710.

When the cleaning of the third sub-region is completed (yes in operation 720), the processor 210 may control the driving device 30 to deviate from the third sub-region UO3, and control the sensor driver 120 to raise the LiDAR sensor 110 in operation 730. In addition, because the processor 210 turns off the LiDAR sensor 110 and the rotation motor upon entering the third sub-region UO3, the processor 210 may turn on the power, which is turned off, again while raising the LiDAR sensor 110.

Further, the number of sub-regions may be determined based on the driving environment of the region under the upper obstacle UO. For example, before the cleaning robot 1 enters the region under the upper obstacle UO, the processor 210 may determine the driving environment of the region under the upper obstacle UO based on the output of the obstacle sensor 180.

Alternatively, before the cleaning robot 1 enters the region under the upper obstacle UO, the processor 210 may divide the region under the upper obstacle UO by the number determined by default, and adjust the number of sub-regions based on information that is collected while the cleaning robot 1 drives in at least one sub-region.

For example, the processor 210 may determine the type of the floor in the region under the upper obstacle UO based on the output of the floor detection sensor provided in the cleaning robot 1, and the processor 201 may re-divide the region under the upper obstacle UO by increasing the number of sub-regions when the type of the floor is a material such as a carpet that causes the cleaning robot 1 to slip.

As another example, the processor 210 may adjust the number of sub-regions based on the output of the obstacle sensor 180.

Alternatively, the processor 210 may not divide the region under the upper obstacle UO before the cleaning robot 1 enters the region under the upper obstacle UO, and the processor 210 may divide the region under the upper obstacle UO based on the information obtained by the floor detection sensor or the obstacle sensor 180 while the cleaning robot 1 drives in the region under the upper obstacle UO.

When an attempt to deviate from the corresponding region and an attempt to raise the LiDAR sensor 110 are performed because the cleaning of each sub-region is completed, but the LiDAR sensor 110 does not reach the second position, the LiDAR sensor 110 may be lowered to the first position, again and the further movement may be performed and then the attempt to deviate from the corresponding region and the attempt to raise the LiDAR sensor 110 may be performed again.

FIG. 22 is a flowchart illustrating an embodiment of raising the LiDAR sensor while driving the region under the upper obstacle in the control method of the cleaning robot according to an embodiment of the disclosure.

Referring to FIG. 22, the cleaning robot 1 may include a sensor, such as a 3D sensor or an optical pattern sensor, configured to obtain information on the size of an obstacle. For example, when the cleaning robot 1 includes the 3D sensor 181, information on the height, width, or depth of an obstacle included in the field of view (FOV) range may be obtained. Accordingly, the processor 210 may calculate the height and width of the upper obstacle UO positioned in front of the cleaning robot 1 based on the output of the 3D sensor 181, and record the calculated height and width in the cleaning map.

Further, the 3D sensor 181 may also obtain information on an inner portion of the upper obstacle UO. For example, as shown in FIGS. 16 and 17, when a partial portion of the upper obstacle UO is open, the processor 210 may determine that the partial portion of the upper obstacle UO is open based on the output of the 3D sensor 181, and record information on the open portion in the cleaning map The processor may lower the LiDAR sensor 110 in front of the upper obstacle UO in operation 440, the cleaning robot 1 may enter the region under the upper obstacle UO and perform cleaning thereof in operation 810, when the cleaning robot 1 enters a region under the open portion of the upper obstacle UO (yes in operation 820), the processor may raise the LiDAR sensor 110, again and recognize a position of the cleaning robot 1 based on an output of the LiDAR sensor 110 in operation 830. Raising of the LiDAR sensor 110 may be performed after the cleaning robot 1 enters the region under the open portion. Because the power of the LiDAR sensor 110 and the power of the rotation sensor are turned off in response to lowering the LiDAR sensor 110, the processor may turn on the power of the LiDAR sensor 110 and the rotation sensor, again.

A method of determining the open portion OP and a description related to adjusting the height of the LiDAR sensor 110 related thereto are the same as those described in the embodiment of the cleaning robot 1.

When the cleaning robot 1 enters the region under the closed portion after driving and cleaning the region under the open portion (no in operation 840), the processor may lower the LiDAR sensor 110, again in operation 850. The processor may determine whether the cleaning robot 1 enters the region under the closed portion based on at least one of the cleaning map, the output of the LiDAR sensor 110, the output of the bumper sensor 130, or the output of the 3D sensor 181. The LiDAR sensor 110 may be lowered before entering the region under the closed portion.

When the cleaning of the region under the upper obstacle UO is completed (yes in operation 860), the processor may control the driving device 30 and the sensor driver 120 to deviate from the region under the upper obstacle UO and to raise the LiDAR sensor 110 to the second position, again in operation 870. Because the power of the LiDAR sensor 110 and the rotation motor is turned off, the processor may turn on the power of the LiDAR sensor 110 and the rotation motor, again.

When the cleaning is not completed (no in operation 860), the processor may repeat the above-described process because the region under the open portion may reappear.

Further, in the above-described embodiment, the case in which the height of the LiDAR sensor 110 and the on/off of the power are controlled according to the height of the upper obstacle UO has been described, but in the control method of the cleaning robot according to one embodiment, the height of the LiDAR sensor 110 and the on/off of the power may be controlled according to the surrounding environment of the cleaning robot 1 or the state of the cleaning robot 1.

The surrounding environment of the cleaning robot 1 may be determined based on at least one of the cleaning map, the output of the bumper sensor 130 or the output of the obstacle sensor 180, and the state of the cleaning robot 1 may include at least one of the standby state, the charging state, the error state, or the operation state.

For example, when the cleaning robot 1 is in the standby state, the charging state, or the error state, the processor 210 may turn off the power of the LiDAR sensor 110 to reduce power consumption. In addition, the processor 210 may turn off the power of the rotation motor configured to rotate the LiDAR sensor 110. A detailed description related thereto is the same as described in the embodiment of the cleaning robot 1.

While the disclosure has been shown and described with reference to various embodiments thereof, it will be understood by those of skilled in the art that various changes in form and details may be made therein without departing from the spirit and scope of the disclosure as defined by the appended claims and their equivalents.

The invention claimed is:

1. A cleaning robot comprising:
a main body;
a driving device configured to move the main body;
a cleaning device configured to perform cleaning by vacuuming foreign substances on a floor;
a Light Detection and Ranging (LiDAR) sensor disposed on an upper portion of the main body and configured to be raisable and lowerable between a first position and a second position, the first position and the second position having different heights;
a bumper sensor configured to detect a collision between the LiDAR sensor and an obstacle;
a sensor driver configured to generate power for raising and lowering the LiDAR sensor;
an obstacle sensor configured to obtain information on an obstacle;
memory storing one or more computer programs; and
one or more processors communicatively coupled to the driving device, the cleaning device, the LiDAR sensor, the bumper sensor, the sensor driver, the obstacle sensor and the memory,
wherein the one or more computer programs include computer-executable instructions that, when executed by the one or more processors, cause the cleaning robot to:
generate a cleaning map based on point cloud information obtained by the LiDAR sensor and information of an obstacle obtained by the obstacle sensor, and
control the sensor driver to adjust a height of the LiDAR sensor based on at least one of the cleaning map, an output of the bumper sensor or the information of the obstacle obtained by the obstacle sensor.

2. The cleaning robot of claim 1, wherein the one or more computer programs further include computer-executable instructions that, when executed by the one or more processors, cause the cleaning robot to control the sensor driver to reduce the height of the LiDAR sensor in response to a collision detected by the bumper sensor between the LiDAR sensor and the obstacle.

3. The cleaning robot of claim 1, wherein one or more computer programs further include computer-executable instructions that, when executed by the one or more processors, cause the cleaning robot to, in response to an upper obstacle spaced from the floor being placed in front of the main body, and a height of the upper obstacle exceeding a height of the main body or a height of the LiDAR sensor at the first position and being less than or equal to a height of the LiDAR sensor at the second position, control the sensor driver to reduce the height of the LiDAR sensor.

4. The cleaning robot of claim 1,
wherein the LiDAR sensor is inserted into an inside of the main body at the first position, and
wherein the LiDAR sensor protrudes to an outside of the main body at the second position.

5. The cleaning robot of claim 1, wherein the one or more computer programs further include computer-executable instructions that, when executed by the one or more processors, cause the cleaning robot to:
turn off the power of the LiDAR sensor in response to the LiDAR sensor being lowered from the second position to the first position, and
turn on the power of the LiDAR sensor in response to the LiDAR sensor being raised from the first position to the second position.

6. The cleaning robot of claim 3, wherein the one or more computer programs further include computer-executable instructions that, when executed by the one or more processors, cause the cleaning robot to, after lowering the LiDAR sensor to the first position, control the driving device and the cleaning device to allow the main body to drive in a region under the obstacle so as to perform cleaning of the region under the upper obstacle.

7. The cleaning robot of claim 6, wherein the one or more computer programs further include computer-executable instructions that, when executed by the one or more processors, cause the cleaning robot to, in response to the cleaning of the region under the obstacle being completed, control the sensor driver to raise the LiDAR sensor to the second position.

8. The cleaning robot of claim 7, wherein the one or more computer programs further include computer-executable instructions that, when executed by the one or more processors, cause the cleaning robot to, in response to the LiDAR sensor not reaching the second position even when the one or more processors control the sensor driver to raise the LiDAR sensor to the second position, control the sensor driver to lower the LiDAR sensor to the first position.

9. The cleaning robot of claim 1, wherein the one or more computer programs further include computer-executable instructions that, when executed by the one or more processors, cause the cleaning robot to, in response to the cleaning robot being in an error state, a standby state, or a charging state, control the sensor driver to lower the LiDAR sensor to the first position and turns off the power of the LiDAR sensor.

10. The cleaning robot of claim 9, wherein the one or more computer programs further include computer-executable instructions that, when executed by the one or more processors, cause the cleaning robot to determine that the cleaning robot is in the error state in response to a situation in which the LiDAR sensor does not reach the second position after the one or more processors control the sensor driver to raise the LiDAR sensor from the first position to the second position, or a situation in which the LiDAR sensor does not reach the first position after the one or more processors control the sensor driver to lower the LiDAR sensor from the second position to the first position.

11. The cleaning robot of claim 1,
wherein the cleaning map comprises a reference map and a real-time map, and
wherein the one or more computer programs further include computer-executable instructions that, when executed by the one or more processors, cause the cleaning robot to:
in response to the reference map of the cleaning map not being present:
generate the reference map based on the point cloud information obtained by the LiDAR sensor and the information of the obstacle obtained by the obstacle sensor,
store the generated reference map in the memory, and
control the driving device to drive based on the reference map.

12. The cleaning robot of claim 11, wherein the one or more computer programs further configured to:
  generate the real-time map based on the point cloud information obtained by the LiDAR sensor, and
  recognize a position of the cleaning robot by comparing the reference map with the real-time map.

13. The cleaning robot of claim 12, wherein the one or more computer programs further include computer-executable instructions that, when executed by the one or more processors, cause the cleaning robot to modify the reference map stored in the memory based on the real-time map.

14. The cleaning robot of claim 1, wherein the one or more computer programs further include computer-executable instructions that, when executed by the one or more processors, cause the cleaning robot to:
  divide a region under the obstacle into a plurality of sub-regions, and
  in response to cleaning of a first sub-region among the plurality of sub-regions being completed:
    control the driving device and the sensor driver to deviate from the first sub-region in which the cleaning is competed, and
    raise the LiDAR sensor from the first position to the second position.

15. The cleaning robot of claim 14, wherein the one or more computer programs further include computer-executable instructions that, when executed by the one or more processors, cause the cleaning robot to:
  re-recognize a position of the cleaning robot based on the point cloud information obtained by the LiDAR sensor,
  in response to the re-recognition of the position being completed, the control the sensor driver to lower the LiDAR sensor to the first position, and
  control the driving device and the cleaning device to enter a second sub-region among the plurality of sub-regions and to perform cleaning of the second sub-region.

16. The cleaning robot of claim 14, wherein the one or more computer programs further include computer-executable instructions that, when executed by the one or more processors, cause the cleaning robot to determine a number of the plurality of sub-regions based on a driving environment of the region under the obstacle.

17. The cleaning robot of claim 3,
  wherein the obstacle sensor comprises a 3D sensor, and
  wherein the one or more computer programs further include computer-executable instructions that, when executed by the one or more processors, cause the cleaning robot to determine information on an inner portion of the upper obstacle based on an output of the 3D sensor.

18. The cleaning robot of claim 17, wherein the one or more computer programs further include computer-executable instructions that, when executed by the one or more processors, cause the cleaning robot to, when a portion of the obstacle is open and the main body enters a region under an open portion:
  control the sensor driver to raise the LiDAR sensor from the first position to the second position, and
  perform position recognition based on an output of the LiDAR sensor at the second position.

* * * * *